United States Patent [19]
Suzuki et al.

[11] Patent Number: 6,108,586
[45] Date of Patent: Aug. 22, 2000

[54] FRACTION DEFECTIVE ESTIMATING METHOD, SYSTEM FOR CARRYING OUT THE SAME AND RECORDING MEDIUM

[75] Inventors: Tatsuya Suzuki, Yokohama; Toshijiro Ohashi, Chigasaki; Seii Miyakawa, Yokohama; Masaaki Asano, Ibaraki-ken; Takashi Kubota, Kawasaki, all of Japan

[73] Assignee: Hitachi, Ltd., Tokyo, Japan

[21] Appl. No.: 09/048,988

[22] Filed: Mar. 27, 1998

[30] Foreign Application Priority Data

Mar. 31, 1997 [JP] Japan ................................. 9-079576

[51] Int. Cl.⁷ .................................................. G06F 19/00
[52] U.S. Cl. ............................ 700/117; 700/110; 702/81; 702/182
[58] Field of Search .............................. 700/117, 21, 39, 700/44, 52, 81, 83, 88, 108, 109, 110, 115, 118–120, 123, 213; 702/182–185, 81–84

[56] References Cited

U.S. PATENT DOCUMENTS

| | | | |
|---|---|---|---|
| 3,875,383 | 4/1975 | Somerville et al. | 235/151.13 |
| 3,876,872 | 4/1975 | Splitz | 235/151.1 |
| 5,497,331 | 3/1996 | Iriki et al. | 700/95 |
| 5,544,256 | 8/1996 | Brecher et al. | 382/149 |
| 5,773,315 | 6/1998 | Jarvis | 438/14 |
| 5,787,021 | 7/1998 | Samaba | 702/81 |
| 5,910,011 | 6/1999 | Cruse | 438/16 |
| 5,946,214 | 8/1999 | Heavlin et al. | 700/128 |
| 5,971,586 | 10/1999 | Mori | 700/108 |

FOREIGN PATENT DOCUMENTS

| | | |
|---|---|---|
| 1-167631 | 7/1989 | Japan . |
| 7-271587 | 7/1989 | Japan . |
| 6-196900 | 7/1994 | Japan . |
| 7-13617 | 1/1995 | Japan . |

Primary Examiner—Joseph E. Palys
Assistant Examiner—Rijue Mai
Attorney, Agent, or Firm—Antonelli, Terry, Stout & Kraus, LLP

[57] ABSTRACT

A method and a system for estimating an assembling-related fraction defective coefficient of an article in the stage preceding to manufacturing, e.g. at a stage of design. Assembling operation, properties/conditions of parts to be assembled and conditions of an assembling shop having significant influence to the likelihood of occurrence of failure in assembling work are inputted as data. Estimated value of assembling-related fraction defective is arithmetically determined with high accuracy by executing an assembling-related fraction defective value estimating program on the basis of the data as inputted.

17 Claims, 18 Drawing Sheets

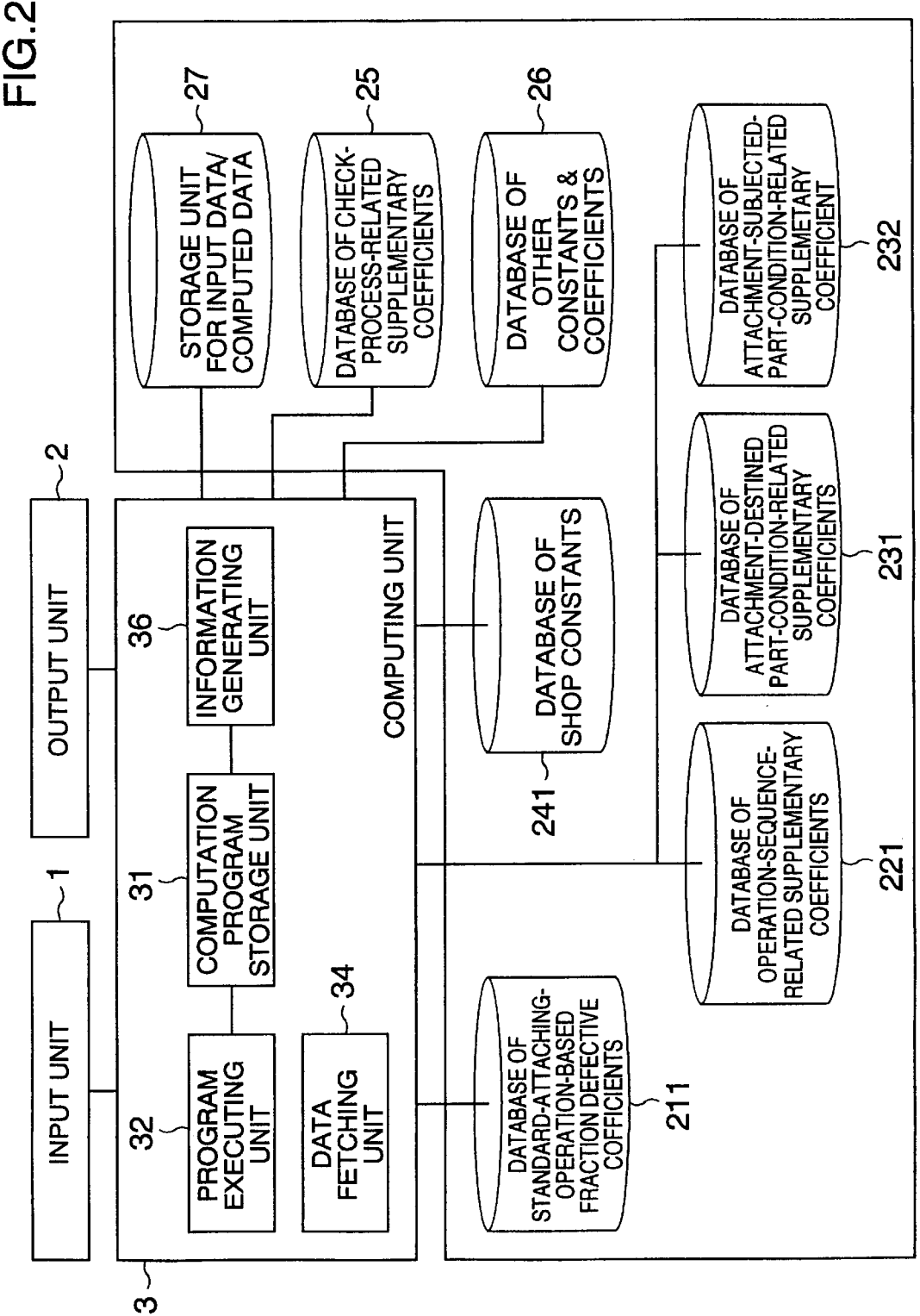

FIG.3A

| TYPE OF OPERATION | SYMBOLS |
|---|---|
| DOWNWARD MOVEMENT | ↓ |
| HORIZONTAL MOVEMENT | → |
| ⋮ | ⋮ |
| SOLDERING | s |
| DEFORMING | d |
| PRESS-FITTING | c |
| ⋮ | ⋮ |

FIG.3B

| SUPPLEMENTARY FACTORS | SYMBOLS |
|---|---|
| FINE HOLE | $h_t$ |
| SMALL HOLE | $h_6$ |
| ⋮ | ⋮ |
| DIFFICULTY OF CONFIRMING COMPLETED ASSEMBLAGE | ? |
| PRESENCE OF CONTACT INHIBITING SURFACE | # |
| ⋮ | ⋮ |

FIG.4

| TYPE OF OPERATION | SYMBOL | FRACTION DETECTIVE COEFFICIENT |
|---|---|---|
| DOWNWARD MOVEMENT | ↓ | 1 |
| HORIZONTAL MOVEMENT | → | 2 |
| ⋮ | ⋮ | ⋮ |
| SOLDERING | s | 5 |
| DEFORMING | d | 8 |
| PRESS-FITTING | c | 7 |
| ⋮ | ⋮ | ⋮ |

FIG.5

| OPERATION SEQUENCE | OPERATION-SEQUENCE-SUPPLEMENTARY COEFFICIENT |
|---|---|
| 1 | 1 |
| 2 | 1.1 |
| 3 | 1.2 |
| ⋮ | ⋮ |

FIG.6

| SYMBOL | SUPPLEMENTARY FACTOR | SUPPLEMENTARY COEFFICIENT |
|---|---|---|
| $h_t$ | FINE HOLE | 5 |
| $h_6$ | SMALL HOLE | 2 |
| ⋮ | ⋮ | ⋮ |
| ⋮ | ⋮ | ⋮ |
| ? | DIFFICULTY OF CONFIRMING COMPLETED ASSEMBLAGE | 5 |
| # | PRESENCE OF CONTACT INHIBITING SURFACE | 5 |
| ⋮ | ⋮ | ⋮ |

FIG.7

| No. | NAMES OF SHOP | SHOP CONSTANT (ppm) |
|---|---|---|
| 1 | A | 5 |
| 2 | B | 10 |
| 3 | C | 8 |
| ⋮ | ⋮ | ⋮ |

(ppm)

FIG.8

| No. | ITEMS | SUPPLEMENTARY COEFFICIENT |
|---|---|---|
| 1 | PRESENCE OF CHECK PROCESS | 0.2 |
| ⋮ | ⋮ | ⋮ |

FIG.9

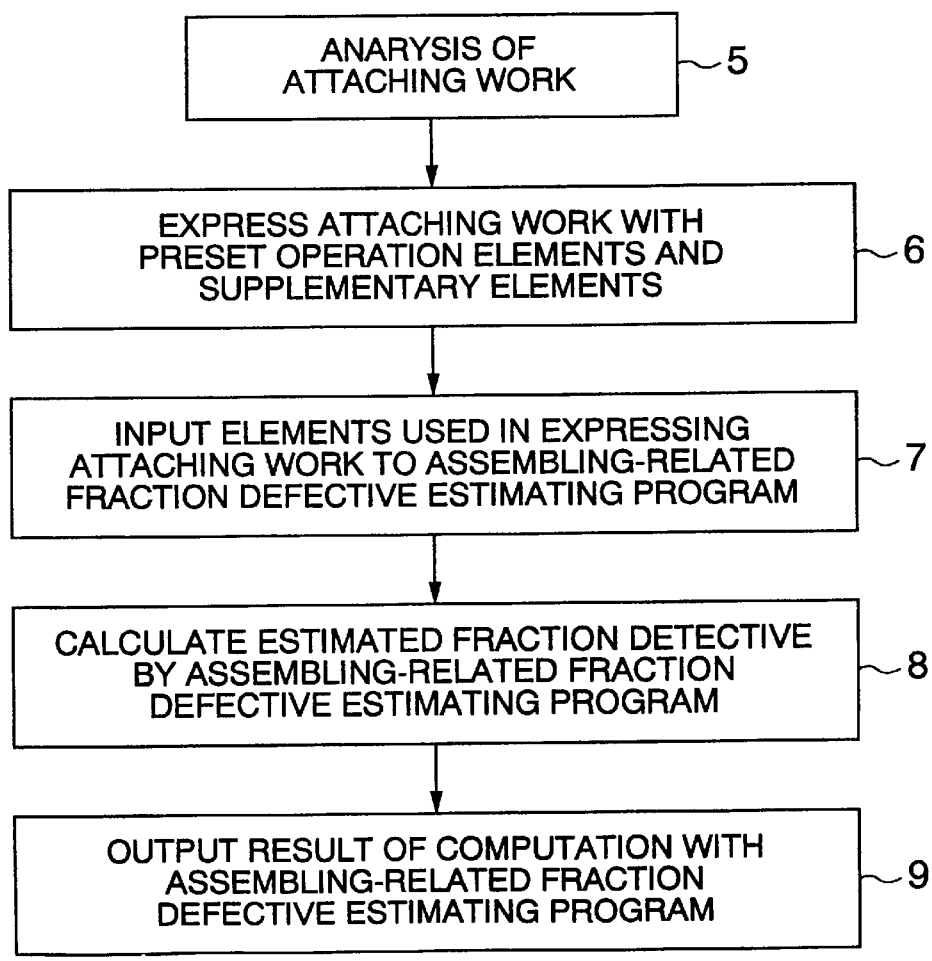

ANARYSIS OF ATTACHING WORK — 5

↓

EXPRESS ATTACHING WORK WITH PRESET OPERATION ELEMENTS AND SUPPLEMENTARY ELEMENTS — 6

↓

INPUT ELEMENTS USED IN EXPRESSING ATTACHING WORK TO ASSEMBLING-RELATED FRACTION DEFECTIVE ESTIMATING PROGRAM — 7

↓

CALCULATE ESTIMATED FRACTION DETECTIVE BY ASSEMBLING-RELATED FRACTION DEFECTIVE ESTIMATING PROGRAM — 8

↓

OUTPUT RESULT OF COMPUTATION WITH ASSEMBLING-RELATED FRACTION DEFECTIVE ESTIMATING PROGRAM — 9

FIG.12

| OPERATION SEQUENCE | OPERATION | PART-CONDITION-RELATED SUPPLEMENTATION | | | | | |
|---|---|---|---|---|---|---|---|
| 1 | | | | | | | |
| 2 | | | | | | | |
| 3 | | | | | | | |
| 4 | | | | | | | |

☐ NUMBER OF PARTS

☐ CHECK PROCESS    PRESENCE ○  ABSENCE ◉

☐ REAL DEFECTIVE NUMBER

☐ REAL FRACTION DEFECTIVE    [FOR COMPUTATION OF SHOP CONSTANT]

FIG.13

| NAME OF ARTICLE | | ARTICLE ID NUMBER | |
|---|---|---|---|

NUMBER OF PRODUCTS

SHOP ▽  (SELECTION FROM PULL DOWN MENU)

SHOP CONSTANT _____ ppm  (POSSIBLE TO INPUT DIRECTLY)

NAME OF SHOP  (FOR SHOP REGISTRATION)

FIG.14

| ARTICLE | A150 | OVERALL FRACTION-DEFECTIVE ESTIMATED VALUE | 2507 |
|---|---|---|---|

| ATTACH-MENT SEQUENCE | NAME OF PART | NUMBER OF PARTS | CONTENTS OF WORK | ESTIMATED VALUE OF FRACTION DEFECTIVE |
|---|---|---|---|---|
| 1 | BASE | 1 | ↓ | 10 |
| 2 | PCB | 1 | ↓ → ? | 100 |
| 3-1 | SCREW | 1 | ↓ | 50 |
| 3-2 | FASTENER | 1 | ↓ C | 50 |
| 3 |  | 1 | ↓ → | 70 |
|  |  |  |  | 100 |

FIG.16

| SYMBOL | SUPPLEMENTARY FACTOR | SUPPLEMENTARY COEFFICIENT |
|---|---|---|
| SS | FINE PART | 4 |
| (m) | WEIGHT (≥1kg) | 1.1 × m |
| # | PRESENCE OF CONTACT INHIBITING SURFACE | 5 |
| ⋮ | ⋮ | ⋮ |

FIG.17
EXAMPLE OF PART ATTACHING WORK COMPLETED
WITH ONE TYPE OF STANDARD OPERATION
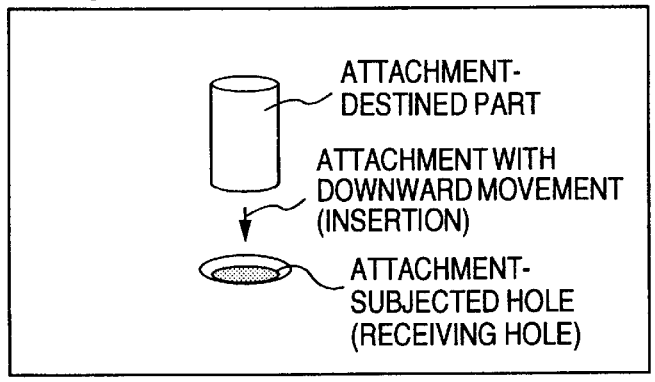
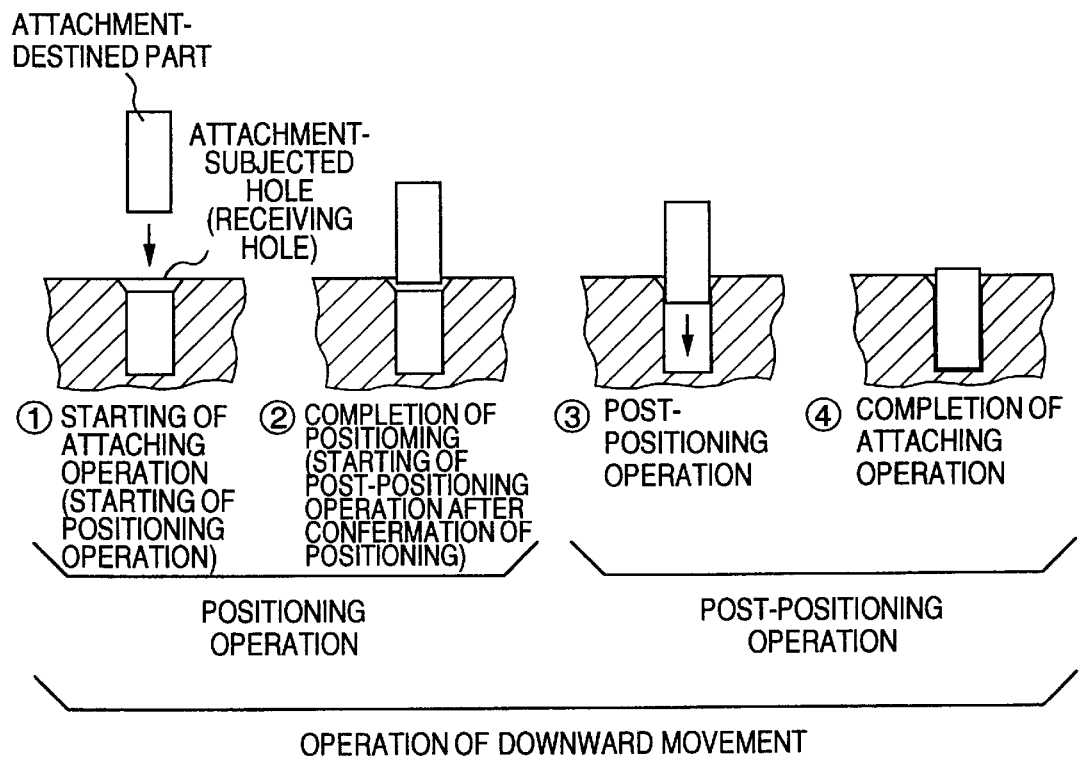

EXAMPLE OF ARRANGEMENT OF ASSEMBLING WORKS

FIG.20

| NAME OF ARTICLE | ○○ UNIT |
|---|---|
| MANUFACTURING PLACE | FIRST LINE AT "A" SHOP |
| BASIC FRACTION DEFECTIVE OF SHOP | 20ppm |

| ESTIMATED FRACTION DEFECTIVE IN TOTAL | 3548ppm |
|---|---|
| NUMBER OF PARTS IN TOTAL | 40 |

INPUT / OUTPUT

| | | | | | | | ESTIMATED FAILURE PHENOMENON | | |
|---|---|---|---|---|---|---|---|---|---|
| | | | | | | | | INCOMPLETED INSERTION | PIN BREAKAGE |
| ATTACHMENT SEQUENCE i | OPERATION SEQUENCE j | ATTACHMENT-DESTINED PARTS: NAMES OF PARTS | ATTACHING OPERATION | SUPPLEMENTARY ELEMENTS: MAXIMUM SIZE | WEIGHT | CONTACT-INHIBITED SURFACE | OTHERS | | |
| | | | | L | M | # | | | |
| 1 | 1 | COVER | ↓ | 400 | | | | 1.5 | |
| | 2 | | ↑ | | | | ? th | 0.1 | |
| | 3 | | C | | | | | | 23 |
| 2 | 1 | PIN | ↗ | | | | 1h ht | | 40 |

PART-BASED FRACTION DEFECTIVE COEFFICIENTS — CAUSES:

| ESTIMATED FRACTION DEFECTIVE (ppm) | POSITIONING | PATH CONTROL | OPERATIVE-EFFORT INSUFFICIENCY |
|---|---|---|---|
| 528 | 3.4 | 0 | 22.5 |
| 80 | 20 | 20 | 0 |

OPERATION-BASED FRACTION DEFECTIVE COEFFICIENT — CAUSES:

| TOTAL | POSITIONING | PATH CONTROL | OPERATIVE-EFFORT INSUFFICIENCY |
|---|---|---|---|
| 1.5 | 1.5 | 0 | 0 |
| 0.1 | 0.1 | 0 | 0 |
| 23 | 0 | 0 | 23 |
| 40 | 20 | 20 | 0 |

FIG.21

| | SYMBOLS | POSITIONING-FAILURE-ASCRIBABLE FRACTION DEFECTIVE COEFFICIENT | PATH-CONTROL-FAILURE-ASCRIBABLE FRACTION DEFECTIVE COEFFICIENT | OPERATIVE-EFFORT-IN-SUFFICIENCY-ASCRIBABLE FAILURE FRACTION DEFECTIVE COEFFICIENT |
|---|---|---|---|---|
| DOWNWARD MOVEMENT | ↓ | 0.1 | 1 | 1 |
| DOWNWARD MOVEMENT FOR POSITIONING | ↓' | 1 | | |
| HORIZONTAL MOVEMENT | → | 0.1 | 1.2 | 1 |
| HORIZONTAL MOVEMENT FOR POSITIONING | →' | 1.2 | | |
| ⋮ | ⋮ | ⋮ | ⋮ | ⋮ |

FIG.22

| | SYMBOLS | POSITIONING-FAILURE-ASCRIBABLE FRACTION DEFECTIVE COEFFICIENT | PATH-CONTROL-FAILURE-ASCRIBABLE FRACTION DEFECTIVE COEFFICIENT | OPERATIVE-EFFORT-IN-SUFFICIENCY-ASCRIBABLE FAILURE FRACTION DEFECTIVE COEFFICIENT |
|---|---|---|---|---|
| FINE HOLE | ht | 5 | 1 | 1 |
| SMALL HOLE | h6 | 2 | 1 | 1 |
| | | | | |
| DIFFICULTY OF CONFIRMING COMPLETED ASSENBLAGE | ? | 5 | 1 | 4.5 |
| PRESENCE OF CONTACT INHIBITING SURFACE | # | 5 | 1 | 1.5 |
| OVER-EXTENDED-DISTANCE INSERTION | lh | 1 | 2 | 1.5 |
| TIGHT FITTING | th | 1 | 1.5 | 5 |
| ⋮ | ⋮ | ⋮ | ⋮ | ⋮ |

FIG.23

(1) EXAMPLE OF DOWNWARD MOVEMENT WORK REQUIRING HIGH ACCURACY IN POSITIONING (NO SUPPLEMENTARY ELEMENT)

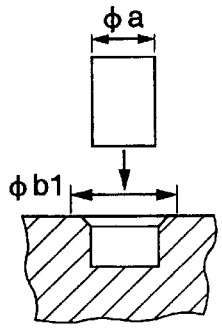

| WORK ANALYSIS | POSITIONING-FAILURE-ASCRIBABLE FRACTION DEFECTIVE COEFFICIENT | PATH-CONTROL-FAILURE-ASCRIBABLE FRACTION DEFECTIVE COEFFICIENT | OPERATIVE-EFFORT-INSUFFICIENCY-ASCRIBABLE FAILURE FRACTION DEFECTIVE COEFFICIENT | OVERALL FRACTION DEFECTIVE COEFICIENT |
|---|---|---|---|---|
| ↓' | 1 | 0 | 0 | 1 |

DOWNWARD MOVEMENT FOR POSITIONING (NO SUPPLEMENTARY ELEMENT)

(2) EXAMPLE OF DOWNWARD MOVEMENT WORK REQUIRING NO ACCURACY IN POSITIONING (WITHOUT SUPPLEMENTARY ELEMENT)

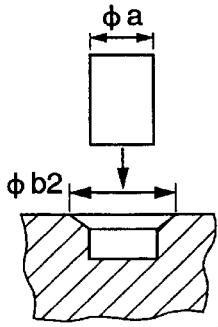

| WORK ANALYSIS | POSITIONING-FAILURE-ASCRIBABLE FRACTION DEFECTIVE COEFFICIENT | PATH-CONTROL-FAILURE-ASCRIBABLE FRACTION DEFECTIVE COEFFICIENT | OPERATIVE-EFFORT-INSUFFICIENCY-ASCRIBABLE FAILURE FRACTION DEFECTIVE COEFFICIENT | OVERALL FRACTION DEFECTIVE COEFFICIENT |
|---|---|---|---|---|
| ↓ | 0.1 | 0 | 0 | 0.1 |

DOWNWARD MOVEMENT (WITHOUT SUPPLEMENTARY ELEMENT)

DATABASE OF STANDARD-ATTACHING-OPERATION-BASED FRACTION DEFECTIVE COEFFICIENTS

| | SYMBOLS | POSITIONING-FAILURE-ASCRIBABLE FRACTION DEFECTIVE COEFFICIENT | PATH-CONTROL-FAILURE-ASCRIBABLE FRACTION DEFECTIVE COEFFICIENT | OPERATIVE-EFFORT-INSUFFICIENCY-ASCRIBABLE FAILURE FRACTION DEFECTIVE COEFFICIENT |
|---|---|---|---|---|
| DOWNWARD MOVEMENT | ↓ | 0.1 | 1 | 1 |
| DOWNWARD MOVEMENT FOR POSITIONING | ↓' | 1 | | |
| HORIZONTAL MOVEMENT | → | 0.1 | 1.2 | 1 |
| HORIZONTAL MOVEMENT FOR POSITIONING | →' | 1.2 | | |

DATABASE OF ATTACHMENT-SUBJECTED PART CONDITION SUPPLEMENTARY COEFFICIENT

| | SYMBOLES | POSITIONING-FAILURE-ASCRIBABLE FRACTION DEFECTIVE COEFFICIENT | PATH-CONTROL-FAILURE-ASCRIBABLE FRACTION DEFECTIVE COEFFICIENT | OPERAITVE-EFFORT-INSUFFICIENCY-ASCRIBABLE FAILURE FRACTION DEFECTIVE COEFFICIENT |
|---|---|---|---|---|
| FINE HOLE | ht | 5 | 1 | 1 |
| SMALL HOLE | h6 | 2 | 1 | 1 |
| DIFFICULTY OF CONFIRMING COMPLETED ASSEMBLAGE | ? | 5 | 1 | 4.5 |
| PRESENCE OF CONTACT INHIBITING SURFACE | # | 5 | 1 | 1.5 |
| OVER-EXTENDED-DISTANCE INSERTION | lh | 1 | 2 | 1.5 |
| TIGHT FITTING | th | 1 | 1.5 | 5 |

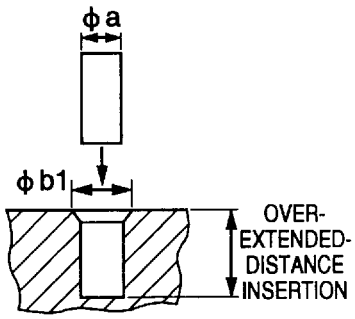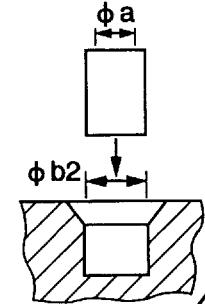
FIG.24

FIG.25

[EXPRESSION 4]

ESTIMATED FRACTION DEFECTIVE IN i-TH PART ATTACHING WORK $$= [\ \Sigma\ \{\ \underbrace{\beta_{ij}}_{\text{BASIC COEFFICIENT OF j-TH OPERATION}} \times\ \underbrace{(K101_{ij} \times K102_{ij} \times \cdots)}_{\text{SUPPLEMENTATION OF j-TH OPERATION IN CONSIDERATION OF PROPERTY OF ATTACHMENT-DESTINED PART}} \times\ \underbrace{(K201_{ij} \times K202_{ij} \times \cdots)}_{\text{SUPPLEMENTATION OF j-TH OPERATION IN CONSIDERATION OF PROPERTY OF ATTACHMENT-SUBJECTED PART}}$$

$$\times\ \underbrace{(K301_{ij} \times K302_{ij} \times \cdots)}_{\text{SUPPLEMENTATION OF j-TH OPERATION IN CONSIDERATION OF SHOP CONDITION}}\ \}\ ] \times \underbrace{K401_i}_{\text{COMPENSATION OF WHOLE i-TH PART ATTACHING WORK (PRESENCE/ABSENCE OF CHECK PROCESS)}}$$

[EXPRESSION 5]

ESTIMATED FRACTION DEFECTIVE IN i-TH PART ATTACHING WORK $$= [\ \Pi\ \{\ \underbrace{\beta_{ij}}_{\text{BASIC COEFFICIENT OF j-TH OPERATION}} \times\ \underbrace{(K101_{ij} \times K102_{ij} \times \cdots)}_{\text{SUPPLEMENTATION OF j-TH OPERATION IN CONSIDERATION OF PROPERTY OF ATTACHMENT-DESTINED PART}} \times\ \underbrace{(K201_{ij} \times K202_{ij} \times \cdots)}_{\text{SUPPLEMENTATION OF j-TH OPERATION IN CONSIDERATION OF PROPERTY OF ATTACHMENT-SUBJECTED PART}}$$

$$\times\ \underbrace{(K301_{ij} \times K302_{ij} \times \cdots)}_{\text{SUPPLEMENTATION OF j-TH OPERATION IN CONSIDERATION OF SHOP CONDITION}}\ \}\ ] \times \underbrace{K401_i}_{\text{COMPENSATION OF WHOLE i-TH PART ATTACHING WORK (PRESENCE/ABSENCE OF CHECK PROCESS)}}$$

FRACTION DEFECTIVE ESTIMATING METHOD, SYSTEM FOR CARRYING OUT THE SAME AND RECORDING MEDIUM

BACKGROUND OF THE INVENTION

The present invention relates to a method and a system for evaluating qualities of articles such as electric/electronic apparatuses for home use, products for office-automation (OA) and the like which are manufactured by assembling constituent parts. More particularly, the present invention is concerned with a fraction defective estimating method for estimating likelihood of occurrence of failure in the works involved in assembling an article, a system for carrying out the fraction defective estimating method and a storage medium storing therein data, information and program for executing the method.

Methods known heretofore for determining the fraction defective are primarily so designed as to estimate the causes for occurrence of defects, failures or the like, starting from the defect events or failure phenomena which have actually taken place. As the hitherto known typical methods of estimating the cause of failure or detect on the basis of the contents of the failure phenomenon or the defect event actually or really taken place at a stage in the course of manufacturing process, there may mentioned those disclosed in Japanese Unexamined Patent Application Publication No. 167631/1989 and Japanese Unexamined Patent Application Publication No. 196900/1994. These methods are based on such techniques that real records of defects occurred in the past are stored together with data concerning the causes of such defects in order to allow a degree of correlation between a defect pattern and the cause for the defect to be determined, whereon the cause for the defect is estimated on the basis of the correlation as determined. Further, as the diagnosis techniques in which the similar techniques are adopted, there may be mentioned those disclosed in Japanese Unexamined Patent Application Publication No. 13617/1995 and Japanese Unexamined Patent Application Publication No. 271587/1995.

However, any one of the known methods mentioned above is directed to the technique for estimating directly the causes of defect events or failure phenomena on the basis of the contents of such defects or failures which have really taken place for the purpose of allowing correcting or repairing work to be carried out speedily and properly.

On the other hand, as a method or procedure for performing in advance a quality evaluation of an article to be manufactured before failure or defect really occurs, there is known an FMEA (Failure Mode and Effects Analysis) technique which can already be adopted in the stage of designing the article to be manufactured. According to this method, an evaluator himself or herself predicts "failure phenomena which may occur in relation to individual parts constituting an article" and summarizes the "failure phenomena or events together with relations to the individual parts in the form of a list. Thus, by referencing the list, the evaluator himself or herself can predict "what sort of influence the article as manufactured will suffer when certain failure(s) or defect(s) occurs". In this way, high-quality design suffering substantially no unintentional omissions can be realized.

Further, there is known a method or procedure for estimating seriousness of defects or failures relating to individual parts, respectively, by determining the probability of occurrence of failure phenomenon in relation to the individual parts as estimated by the evaluator (which probability is termed the fraction defective) and then estimating the degree of seriousness of defect of an article as manufactured which can be considered as being ascribable to the defect(s) of the individual parts. As a typical one of such techniques, there may be mentioned FMECA (Failure Mode, Effects and Criticality Analysis) technique.

However, any one of the conventional methods or techniques mentioned above is not in the position to estimate the potential of detector failure to occur in a given article with high accuracy. This is because substantially all the failure phenomena which may actually occur have to be grasped in the case of the conventional methods.

Under the circumstances, not a few manufacturing failures actually take place due to insufficiency of examination or studying, presenting one of the factors for deterioration of the quality of the manufactured article.

SUMMARY OF THE INVENTION

In the light of the art described above, it is an object of the present invention to provide a method and a system for estimating the potential of occurrence of failure in assembling a given article already in the stage preceding to manufacturing process, e.g. at a stage of design, manufacturing process planning or the like.

At this juncture, it should be mentioned that with the term "part" used herein, it is contemplated to encompass both an elementary part and an assembled part or subassembly constituted by a plurality of the elementary parts. Accordingly, with a phrase "part attaching work", it is intended to encompass both the attaching works not only for an elementary part but also an assembled part, respectively. Further, an elementary part or an assembled part which is to be attached to another elementary part or assembled part will be collectively referred to as "attachment-destined part" while the latter which is subjected to or undergoes the attachment will be referred to as "attachment-subjected part".

In view of the above and other objects which will become apparent as the description proceeds, it is taught according to the present invention that an estimated value of assembling-related fraction defective which indicates likelihood of occurrence of defectives in an assembled article is determined on the basis of information concerning factors which exert influence to the probability of occurrence of failure in relation to the operations which are involved in part attaching works and which can not always be performed by a worker without fail. (The probability mentioned above will hereinafter be referred to also as the uncertainty.)

In a preferred mode for carrying out the invention, the estimated value of the assembling-related fraction defective is arithmetically determined on the basis of information concerning the contents of operations involved in part attaching works, information concerning properties of an attachment-destined part or parts and information concerning properties of an attachment-subjected part or parts.

To this end, according to an aspect of the present invention, species or types of operations required for expressing the contents of the operations involved in the part attaching works (such as operation for downward movement, operation for horizontal movement and the like which are correctively referred to as standard attaching operation) are determined, and numerical values indicating low or high probabilities that standard attaching operations can not be performed without fail under predetermined conditions inclusive of "condition imposed by an operator or worker, condition imposed by a part and conditions imposed by a work-shop" (these conditions will be referred to as basic conditions) is determined or set for each of the standard attaching operations as determined. (The numerical values mentioned above will be referred to also as the standard-attachment-operation-based fraction defective coefficient.)

In another mode for carrying out the invention, an object under evaluation is expressed in terms of a combination of preset standard attaching operation elements for the purpose of facilitating user interface.

Furthermore, according to another aspect of the present invention, it is taught with a view to enhancing the estimation accuracy of the assembling-related fraction defective that in addition to the aforementioned standard attaching operation elements used for expressing the contents of attaching operations involved in the part attaching work, properties of the attachment-destined part and the attachment-subjected part which exert influence to the uncertainty of the attaching operation are expressed in terms of part-condition-related supplementary factors mentioned below, whereon the estimated value of the assembling-related fraction defective is arithmetically determined on the basis of the part-condition-related supplementary factors. More specifically, the factors exerting influence to the uncertainty of attaching work performed by a worker among the properties of the attachment-destined part and the attachment-subjected part (these factors are referred to as the part-condition-related supplementary factors) are determined, whereon for the part attaching work for an object for which the assembling-related fraction defective is to be estimated, those part-condition-related supplementary factors which are relevant to the properties of the attachment-destined part or attachment-subjected part in the part attaching work of concern are selected from the preset part-condition-related supplementary factors mentioned above for expressing the contents of the attaching operation in addition to the expression given in terms of combination of the standard attaching operations as mentioned above.

According to another aspect of present invention, it is taught with a view to enhancing further the accuracy in estimating the assembling-related fraction defective that for the part attaching work in assembling an article for which the fraction defective is to be estimated, information indicating whether a step or process for confirming if the part attaching work of concern has been performed correctly and properly is provided or not in succession to the assembling work process is used in addition to the standard attaching operation elements expressing the contents of attaching operation involved in the part attaching work and the part-condition-related supplementary factors giving influence to the uncertainty of the attaching operation, for thereby arithmetically determining the estimated value of the assembling-related fraction defective.

According to a further aspect of the present invention, it is taught with a view to enhancing further the accuracy in estimating the assembling-related fraction defective that the estimated value of the assembling-related fraction defective is arithmetically determined on the basis of a numerical value (referred to as the shop constant) indicating degree of influence of the shop conditions and reflecting the factors exerting influence to the uncertainty of the attaching operation such as the condition imposed by the worker, the condition imposed by equipment installed in the assembling shop, environmental condition and the like for the part attaching work in addition to the standard attaching operation elements expressing the contents of attaching operation involved in the part attaching work, the part-condition-related supplementary factors exerting influence to the uncertainty of the attaching operation and the information indicating whether a step or process for confirming if the part attaching work of concern has been performed correctly and properly is provided or not in succession to the assembling work process.

According to a still further aspect of the present invention, it is taught that the fraction defective coefficients each for each of the individual standard attaching operations of the attachment-destined part, the supplementary coefficients each for each of the properties of the attachment-destined parts and the supplementary coefficients each for each of the properties of the attachment-subjected parts are stored in advance, wherein the information representing the combination of predetermined standard attaching operations for expressing an object under evaluation and the information representing the properties of an attachment-destined part and the attachment-subjected part of the object under evaluation are inputted, whereon the fraction defective coefficients for the standard attaching operations of concern, the relevant supplementary coefficient for the attachment-destined part and the relevant supplementary coefficient for the attachment-subjected part are extracted from the inputted information, to thereby arithmetically determine the assembling-related fraction defective of the object under evaluation by adding together the values resulting from supplementation of the individual fraction defective coefficients as extracted with the supplementary coefficients for the attachment-destined parts and those for the attachment-subjected parts.

According to a yet further aspect of the present invention, there is provided a fraction defective estimating system which includes a means for storing fraction defective coefficients each for each of individual standard attaching operations for attachment-destined parts, supplementary coefficients each for each of properties of the attachment-destined parts and supplementary coefficients each for each of properties of attachment-subjected part, a means for inputting information representing a combination of predetermined standard attaching operations for expressing an object under evaluation as well as information representing the properties of the attachment-destined parts and the attachment-subjected part of an object under evaluation, and a means for extracting the fraction defective coefficient for the standard attaching operation of concern, the relevant supplementary coefficient for the attachment-destined part and the relevant supplementary coefficient for the attachment-subjected part from the inputted information, to thereby arithmetically determine an assembling-related fraction defective for the object under evaluation by adding together values resulting from supplementation of the individual fraction defective coefficients as extracted with the supplementary coefficients for the attachment-destined parts and those for the attachment-subjected parts.

Furthermore, according to the present invention, there is provided such arrangement that when fraction defective coefficients for every standard attaching operation for attachment-destined parts, supplementary coefficients for every property of an attachment-destined part, supplementary coefficients for every property of attachment-subjected parts, information representing a combination of predetermined standard attaching operations for expressing an object under evaluation and the information concerning properties of the attachment-destined parts and the attachment-subjected part constituting the object under evaluation are inputted, fraction defective coefficients for relevant standard attaching operations, supplementary coefficients relating to the attachment-destined part and supplementary coefficient relating to the attachment-subjected part are extracted from the input information, for thereby arithmetically determining an assembling-related fraction defective of the object under evaluation by adding together values obtained by supplementing the extracted individual fraction defective coefficients with the supplementary coefficients relating to the attachment-destined part and those relating to the attachment-subjected parts. The procedure described above can be executed by a computation unit with the aid of a program designed properly to this end.

In this conjunction, it is preferred to store previously the supplementary coefficients for every number of attachments to be carried out for thereby arithmetically determining an assembling-related fraction defective by supplementing the aforementioned fraction defective coefficient with the supplementary coefficient relating to the number of attachments required in realizing the object under evaluation, or store previously a supplementary coefficient corresponding to presence or absence of a process for confirming whether the attachment-destined part has been properly attached to the attachment-subjected part, for thereby arithmetically determining an attachment-related fraction defective of the object under evaluation by supplementing additionally the fraction defective coefficient with the corresponding supplementary coefficients in the case where there exists the process for confirming whether the attachment-destined part has been properly attached to the attachment-subjected part.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 2 is a functional block diagram illustrating functions performed internally by the fraction defective estimating system;

FIG. 3A is a view showing typical examples of standard attaching operations and symbols indicating the operations, respectively, in a database;

FIG. 3B is a view showing some examples of part-condition-related supplementary factors together with corresponding symbols;

FIG. 4 is a view illustrating, by way of example, data in a database of standard-attaching-operation-based fraction defective coefficients in the system according to an embodiment of the invention;

FIG. 5 is a view showing, by way of example, data of operation-sequence-related supplementary coefficients;

FIG. 6 is a view illustrating, by way of example, data in a database of supplementary coefficients relating to part conditions of an attachment-subjected part;

FIG. 7 is a view showing, by way of example, contents of a shop constant database;

FIG. 8 is a view showing, by way of example, data in a database of check-process-related supplementary coefficients;

FIG. 9 is a flow chart for illustrating a procedure for arithmetically determining an estimated value of an assembling-related fraction defective in a part attaching work;

FIG. 12 is a view showing an example of an input interface display in the system according to the invention;

FIG. 13 is a view showing another example of the input interface display in the system according to the invention;

FIG. 14 is a view showing an example of an output interface display in the system according to the invention;

FIG. 16 is a view showing, by way of example, a computation model for arithmetically determining a assembling-related fraction defective;

FIG. 17 is a view showing, by way of example, a flow of operations in a part attaching work;

FIG. 20 is a view showing, by way of example only, display of information and data outputted from a fraction defective estimating system according to another embodiment of the present invention;

FIG. 21 is a view showing an example of database employed in the fraction defective estimating system according to another embodiment of the invention;

FIG. 22 is a view showing, by way of example, another database employed in the fraction defective estimating system according to another embodiment of the invention;

FIG. 23 is a view showing examples of the processing executed in the fraction defective estimating system according to another embodiment of the invention;

FIG. 24 is a view showing other examples of the processing executed in the fraction defective estimating system according to the invention; and FIG. 25 is a view showing formulae for estimating part-attachment-related fraction defectives.

DESCRIPTION OF THE PREFERRED EMBODIMENTS

Figure 1:
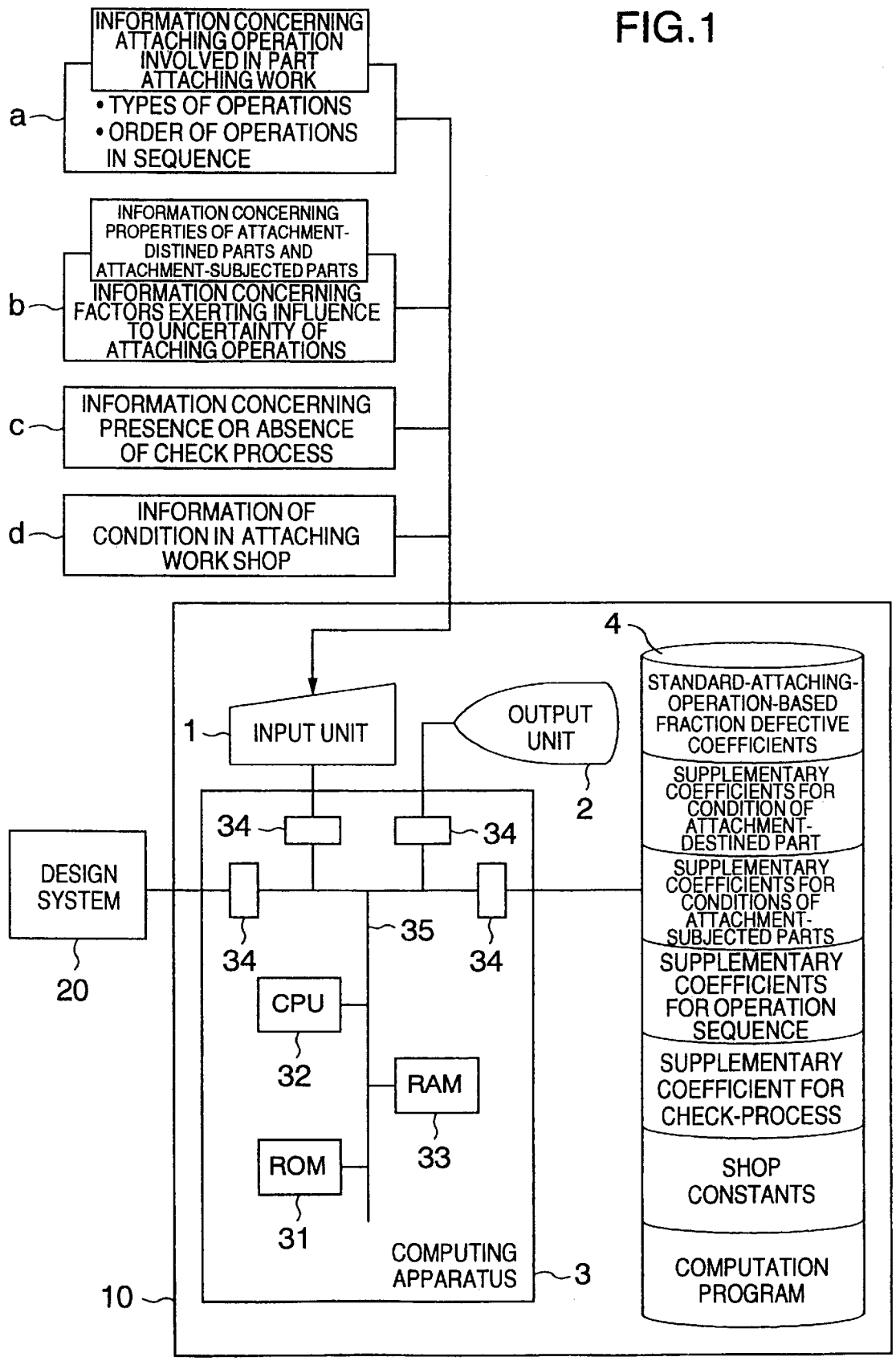
FIG. 1 is a schematic block diagram showing generally and schematically a system configuration of a fraction defective estimating system for estimating a fraction defective in an assembling work according to an embodiment of the invention.

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "horizontal", "downward" and the like are words of convenience and are not to be construed as limiting terms.

Now, referring to the drawings, description will be made of a processing for estimating a fraction defective in an article assembling work (hereinafter also referred to as the assembling-related fraction defective) which processing can be carried out with the aid of a fraction defective estimating system according to an embodiment of the present invention.

FIG. 1 is a schematic block diagram showing generally and schematically a system configuration of the fraction defective estimating system for estimating a fraction defective relating to an assembling work according to the teaching of the present invention.

Referring to FIG. 1, a computation system shown therein is generally comprised of a fraction defective estimating system 10 according to an instant embodiment of the invention and a design system 20 which in turn is composed of a two-dimensional CAD (computer aided design) system or a three-dimensional CAD system, a part information database for storing information concerning names of parts, part identifying (ID) numbers, materials, weights, unit prices, etc. and others.

The fraction defective estimating system 10 is composed of an input unit 1 constituted by a keyboard, a mouse, a pen-input tablet, a storage medium, an input facility connected to a network or the like, an output unit 2 constituted by a display unit such as a display monitor, a printer, an output facility connected to an external system via a network or the like, a computing apparatus 3 designed for executing the estimation procedure according to the present invention, and a storage unit (external storage unit) 4 for storing a variety of information used for arithmetically determining or calculating the fraction defectives. On the other hand, the computing apparatus 3 is comprised of a central processing unit or CPU 32, a read-only memory or ROM 31 storing a predetermined program or programs, a random access memory or RAM 33 for storing temporarily various data, an input/output interface 34, a bus line 35 and others.

According to the teaching of the present invention incarnated in the fraction defective estimating system, a process or work for assembling a product or an assembled part or subassembly is represented by a combination of predefined standard attaching operations, to thereby calculate or compute a likelihood of occurrence of assembling failure (i.e., assembling-related fraction defective) by totalizing fraction defective coefficients relevant or relating to the individual standard attaching operations, respectively. With a view to enhancing the accuracy of the fraction defective estimation, the number of attaching operations required for completing a given assembling work, conditions relating to the attachment-destined parts and attachment-subjected parts such as the conditions e.g. by shapes, dimensional precisions, surface states, sizes, weights, materials, functions and the like, conditions relating to the assembling work-shops, and the presence or absence of a process for confirming the completed assemblage are employed as supplementary coefficients in computing the likelihood of occurrence of assembling failure (fraction defective).

In other words, an object under evaluation is represented by a combination of standard attaching operations, wherein values obtained by correcting supplementarily the fraction defective coefficients predetermined for the individual standard attaching operations, respectively, with the number of attaching operations, the conditions given by the attachment-destined parts and the attachment-subjected parts, respectively, the conditions imposed by the assembling work-shop and the presence or absence of the completed assemblage confirming process are totalized, for thereby computing the fraction defective.

The reason why the fraction defective of the part attaching work is determined by taking into account the contents of operations involved in the attaching work, the properties of the attachment-destined parts and the attachment-subjected parts, the presence/absence of the process or step of confirming whether the work has been completed properly or satisfactorily and the conditions relating to the assembling work-shop, as described above, can be explained as follows.

Needless to say, any attaching operation is accompanied with the possibility or potential of the assembling-related failure taking place. (Such potential is referred to as the assembling-related fraction defective coefficient.) In this conjunction, it is noted that a major factor which affects primarily the defect occurrence likelihood can be found in the attaching operation.

As the factors increasing or decreasing the assembling-related fraction defective coefficient in the attaching operation, there can be mentioned properties or statuses of the attachment-destined part as well as the attachment-subjected part and the conditions of the work-shop or field where the attaching work is performed.

By way of example, with regards to the properties of the attachment-destined part and the attachment-subjected part, the assembling-related fraction defective coefficient of the attaching operation is amplified or increased when the attachment-destined part and/or the attachment-subjected part have shapes which make it difficult to perform the attachment operation.

Similarly, the assembling-related fraction defective coefficient of the attaching operation is affected by the condition of the work-shop or field where the assembling work is performed. By way of example, when equipment employed for the assembling work is likely to produce defectives, the fraction defective coefficient of the attaching operation will increase when compared with the case where the equipment which is unlikely to produce the detective for a same assembling work. Furthermore, when the operation workers engaged in assembling work in the assembling shop or field have high skill as a whole, the fraction defective coefficient for a given attaching operation becomes a low value when compared with the assembling shop where the workers are of low skill.

Additionally, by providing as the defective detection potential the check process for confirming whether a given attaching work has been completed satisfactorily in succession to the attaching work process for an object for which of the assembling-related fraction defective is to be estimated, occurrence of the defect can be detected in this check process or step, whereon suitable measures for coping with the defect can be taken. Thus, the probability of the assemblage becoming finally defective can be lowered.

For the reasons mentioned above, in the fraction defective estimating system according to the instant embodiment of the invention, the fraction defective is arithmetically determined or computed on the basis of the contents of operations involved in the attaching work, the properties of the attachment-destined part and the attachment-subjected part, the presence or absence of the check process for confirming whether the attaching work has been completed as desired, and the conditions given by the work-shop where the attaching work is performed, since these represent factors which exert non-negligible influence to the occurrence of the assembling failure.

To this end, the storage unit 4 is designed to store the coefficients corresponding to the kinds or types of part attaching operations, coefficients relating or corresponding to the number of attaching operations which are required for completing a given assembling work (also referred to as the number of attachments), coefficients corresponding or relating to properties of the attachment-destined part and the attachment-subjected part (e.g. shape, dimensional precision, surface state, size, weight, material, function, etc.), coefficient corresponding or relating to the provision of the process or step of confirming the completed assemblage in succession to the attaching work, coefficient corresponding or relating to the condition of the assembling work-shop where the assembling work is to be done, and the computation program(s) containing arithmetic expressions or formulae for arithmetically determining the fraction defective and executed by the fraction defective estimating system now under consideration. The coefficients stored in the database are so preset that they assume large values or alternatively small values for the items for which the defect or failure is more likely to occur.

Preferably, these coefficients should be determined in consideration of real data of the assembling failures which occurred really in the past.

In the computation program stored in the storage unit 4, there are used the assembling failure estimating formulae which are mentioned below:

Estimated value of assembling-related fraction defective in part attaching work $$=f1 \text{ (content of attaching operation, properties of parts,}$$
$$\text{conditions given by work-shop and presence or absence}$$
$$\text{of check process)} \quad (1),$$

or $$f2 \text{ (attachment-operation-based fraction defective coefficient,}$$
$$\text{part-related supplementary coefficients, shop-related}$$
$$\text{supplementary coefficients, check-process-related}$$
$$\text{supplementary coefficient)} \quad (2),$$

where f1( ) and f2( ) represent functions, respectively.

Figure 11:
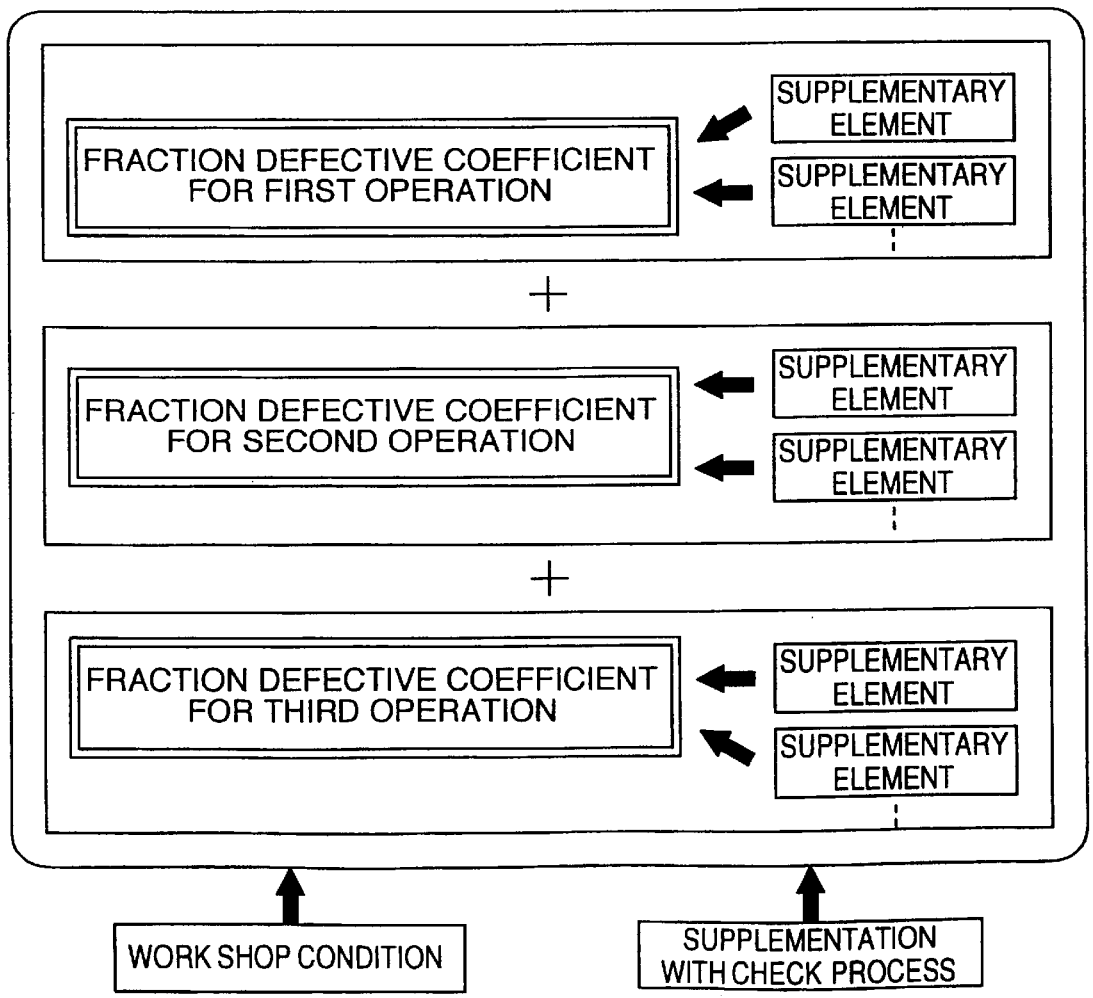
FIG. 11 is a view showing a computation model for computing estimated value of the assembling-related fraction defective according to the invention.

Thus, the likelihood of occurrence of failure in the part attaching work constituted by a time series of three consecutive operations can be arithmetically determined by adding together the values obtained by correcting supplementarily the fraction defective coefficients of the first attaching operation, second attaching operation and the third attaching operation, respectively, with the part-related supplementary coefficient, the shop-related supplementary coefficient and the check-process-related supplementary coefficient, as can be seen in FIG. 11.

On the other hand, there can be conceived various methods for expressing in terms of formulae the supplementation of the individual operations by using the part-related supplementary coefficients, shop-related supplementary coefficient and the check-process-related supplementary coefficient. By way of example, there may be mentioned a method of multiplying the attachment-operation-based fraction defective coefficient by the part-related supplementary coefficient, shop-related supplementary coefficient and the check-process-related supplementary coefficient, a method of subtracting or adding the part-related supplementary coefficient, shop-related supplementary coefficient and the check-process-related supplementary coefficient from or to the attachment-operation-based fraction defective coefficient or an exponential supplementing method.

Furthermore, as the supplementation method for the case where a plurality of part-related supplementary coefficients, shop-related supplementary coefficients and the check-process-related supplementary coefficients are present for a single attaching operation, there are conceivable a method of multiplying the attachment-operation-based fraction defective coefficient relevant to the above-mentioned attaching operation by all the part-related supplementary coefficients, shop-related supplementary coefficients and the check-process-related supplementary coefficients, a method of adding (or subtracting) all of the part-related supplementary coefficients, shop-related supplementary coefficients and the check-process-related supplementary coefficients to (or from) the attachment-operation-based fraction defective coefficient of that attaching operation.

For carrying out the present invention, there may be selected any one of appropriate methods or procedures mentioned above so long as the attachment-operation-based fraction defective coefficient can be supplementarily corrected, i.e., supplemented, with the part-related supplementary coefficient, shop-related supplementary coefficient and the check-process-related supplementary coefficient. In this conjunction, it should however be mentioned that the operation-sequence-related supplementary coefficient, the check-process10 related supplementary coefficient and the shop-related supplementary coefficient (which may also be referred to as the shop constants) are not necessarily required in carrying out the invention.

In the fraction defective estimating system now under consideration, the information (a to d) illustrated in FIG. 1 is inputted through the input unit 1.

At first, information (a) representing a given attaching work with types of previously prepared standard attaching operations as involved and the sequence thereof is inputted through the input unit 1. More specifically, symbols indicating preset standard attaching operation elements are inputted in accordance with a sequence in which the operations involved in the attaching work are to be performed. FIG. 3A shows some typical examples of the standard attaching operations and the symbols indicating the operations, respectively, which may be inputted to the fraction defective estimating system according to the invention. The standard attaching operations are selected as they are considered to be necessary for representing or expressing the operations involved in realizing a given part attaching work. In the case of the instant embodiment of invention, several types of standard attaching operations such as "downward movement", "horizontal movement", "insertion under pressure or press-fitting" and others are selected as the standard attaching operations. Among these preset standard attaching operations, the operation(s) which are involved in the given part attaching work and for which the fraction defectives are to be estimated, respectively, are expressed by using operation indicating symbols. By way of example, it is assumed that an attaching operation for a given part includes "downward displacement of the part which is followed by horizontal displacement of the part and finally press-fitting of the part". In that case, the information which concerns the attaching operations for the assumed part attaching work and which is to be inputted can be expressed by the three standard attaching operation elements, i.e., downward movement, horizontal displacement and the press-fitting, and thus by a sequence of operation symbols "↓→C".

Subsequently, those conditions (b) are inputted which exert influence to the uncertainty (defect occurrence likelihood) of the attaching work operations for the attachment-destined parts and the attachment-subjected part in the attaching work of concern. By way of example, shape, dimensional precision, surface state, size, weight, material, function, etc. are inputted. More specifically, those factors which have influence to the degree of uncertainty of the attaching work operations performed by a worker are selected from the properties of the attachment-destined parts and the attachment-subjected part, wherein the factors thus determined are inputted in terms of symbols representing these factors, respectively. Furthermore, characteristic of the factor (e.g. weight value) may be inputted when occasion requires. FIG. 3B shows, by way of example, some of the part-condition-related supplementary factors together with corresponding symbols in the system according to the instant embodiment. In the case of the fraction defective estimating system according to the instant embodiment, there are preset several kinds of part-condition-related supplementary factors such as "fine hole", "small hole", "difficulty of confirming completed attachment (e.g. difficulty presented by shapes and properties of the attachment-destined parts and the attachment-subjected parts in deciding or confirming visibly, feelingly or audibly whether or not the attachment of the part has been completed)", "presence of contact inhibiting surface (presence of a portion in the attachment-destined part or attachment-subjected part which is inhibited from being contacted from the standpoint of function and/or performance of the assembly)" and the like.

Next, the information (c) indicating presence or absence of the process for confirming whether the attaching work has been completed satisfactorily is inputted. As mentioned previously, the presence of such confirmation process can contribute to lowering the likelihood of occurrence of the assembling failure which is determined by the attaching operations and the part conditions described above.

Inputted in succession is the information (d) concerning the factors having influence to the uncertainty of the operation involved in attaching the attachment-destined part to the attachment-subjected part in the attaching work. As the information (d), there may be mentioned the condition imposed by the worker working in an assembling workshop, conditions given by the equipment as used, environmental condition and so forth. In that case, information indicating the characteristics of the factors (e.g. temperature and humidity of the shop, production lot, production rate of a relevant production line, etc.) may be inputted as occasion requires. According to the invention incarnated in the instant embodiment, the estimated value of the assembling-related fraction defective is computed conveniently on a shop-by-shop basis by using a numerical value (shop constant) indicating the likelihood of occurrence of the assembling failure on an average. With the shop constant, it is contemplated to represent a multiple value indicating how large the fraction defective in a given shop is relative to the fraction defective in a basic shop where a predetermined given assembling work (referred to as the basic work) is assumed to be performed. Although the shop constant is inputted directly in the fraction defective estimating system according to the instant embodiment of the invention, information which can discriminatively identify a given shop may be inputted, provided that the shop constants are previously stored in the storage unit 241 (shop constant database) on a shop-by-shop basis.

At this juncture, it should be mentioned that the sequence or order in which the information is inputted is never restricted to that described above. To say in another way, the information may be inputted in any sequence as desired. Further, it should also be added that there may exist some cases where the information (c) concerning the presence or absence of the check process and/or the information (d) concerning the assembling shop conditions can be spared.

In the fraction defective estimating system now under consideration, the CPU 32 executes the computation program stored in the storage unit 4 upon completion of the inputting operation of the information mentioned above, to thereby extract the coefficients corresponding to the input information from the storage unit 4 onto the RAM 33, whereon the estimated value of the assembling-related fraction defective in the part attaching work of concern is generated on the basis of the input information in accordance with the formula (2) mentioned previously.

Now, internal processings executed internally by the fraction defective estimating system will be described in more detail by reference to a functional block diagram shown in FIG. 2.

In the fraction defective estimating system 10 shown in FIG. 2, the computing apparatus 3 shown in FIG. 1 is composed of a data fetching unit 34 for fetching design information and other from the design system 20, a program executing unit 32 for executing the estimation processing taught by the present invention, a computation program storage unit 31 for storing a program or programs for the estimation processing taught by the invention and an information generating unit 36 for generating new information on the basis of indications or commands displayed on the display unit 2, while the storage unit 4 stores varies databases. Parenthetically, the program executing unit 32 may be so designed as to perform the function(s) of the information generating unit 36 as well.

Now, the contents of the various databases stored in the storage unit 4 will be described below.

A standard-attaching-operation-based fraction defective coefficient database 211 is adapted to store "standard-attachment-operation-based fraction defective coefficients", i.e., coefficients indicating likelihood of occurrence of work failure in each of the attaching operations preset for each of the types of predetermined standard attaching operations such as e.g. "downward movement", "horizontal movement" and the like. FIG. 4 is a view illustrating examples of the data of the standard-attaching-operation-based fraction defective coefficient database 211 in the fraction defective estimating system according to the instant embodiment of the present invention. With the standard attachment-operation-based fraction defective coefficient, it is contemplated to indicate a value of probability at which a work carried out for each unitary standard attaching operation in the basic state results in failure. The standard attachment-operation-based fraction defective coefficient can be set relatively with reference to a value of the probability of occurrence of the work failure in a given attaching operation. In the case of the fraction defective estimating system according to the instant embodiment of the invention, the fraction defective coefficients for the individual standard attaching operations are previously established with reference to the "downward movement" which requires the simplest operation and for which the assembling work failure is difficult to occur. In more concrete, the attachment-operation-based fraction defective coefficient for "downward movement" is imparted with a basic value "1", whereon multiples indicating degrees of the likelihood of occurrence of failure in the other standard attaching operations, respectively, relative to the "downward movement" operation are set as the standard attachment-operation-based fraction defective coefficients for the other standard attaching operations, respectively. By way of example, the attachment-operation-based fraction defective coefficient for the "horizontal movement" is allocated with the value of "2" in the case of the data illustrated in FIG. 4, which means that the likelihood of occurrence of failure in the "horizontal movement" operation is twice as large as that in the "downward movement" operation.

The operation-sequence-related supplementary coefficient database 221 stores "operation-sequence-related supplementary coefficients", i.e., the supplementary coefficients for increasing "attachment-operation-based fraction defective basic coefficient" for each of individual attaching operations involved in a given attaching work in dependence on the turns in the sequence of the attaching operations because the work will become more complicated as the number of operations involved in a given attaching work expressed by a plurality of standard attaching operation elements increases. FIG. 5 shows, by way of example only, data of the operation-sequence-related supplementary coefficients. As can be seen in FIG. 5, the operation-sequence-related supplementary coefficients may be set in dependence on the turns in the operation sequence such that the operation-sequence-related supplementary coefficient for the first operation is allocated with "1", that for the second operation is allocated with "1.1", the third operation is allocated with "1.2" and so forth. As an alternative, the operation-sequence-related supplementary coefficient database 221 may be so designed as to contain a coefficient calculating expression for calculating the operation-sequence-related supplementary coefficients as a function of the turn of a concerned operation in the operation sequence. By way of example, representing the operation located at n-th turn in the operation sequence by n, the following formula $$\text{operation-sequence-related supplementary coefficient} = n \times 1.1 \quad (3)$$

may be contained in the database as the data, for thereby determining the estimated value of the assembling-related fraction defective by taking into account the operation-sequence-related supplementary coefficient determined in accordance with the above formula (3) read out upon determination of the estimated value of the assembling-related fraction defective.

It is further noted that the likelihood of occurrence of the work failure in the individual attaching operations is subjected to the influence of the conditions or states of the attachment-destined parts, the counterpart attachment-subjected part and the ambient conditions thereof. For this reason, there is provided the attachment-destined-part-condition-related supplementary coefficient database 231. More specifically, the likelihood of occurrence of the work failure in each of the attaching operations can vary as a function of the properties of the attachment-destined part such as the size, weight, material, the number of positional alignments as required and the like. Similarly, the above-mentioned likelihood varies in dependence on the similar property conditions of the attachment-subjected part. For the reasons mentioned above, there are stored in the attachment-destined-part-condition-related supplementary coefficient database 231 and the attachment-subjected-part-condition-related supplementary coefficient database 232 the attachment-destined part property factors and the attachment-subjected part property factors which exert significant influence to the likelihood of occurrence in the respective attaching operations together with the part-condition-related supplementary coefficients for supplementing the standard attachment-operation-based fraction defective coefficients on a factor-by-factor basis. FIG. 6 is a view illustrating examples of data in the attachment-destined-part-condition-related supplementary coefficient database 231 and the attachment-subjected-part-condition-related supplementary coefficient database 232. As can be seen in the figure, the supplementary coefficient value is predetermined and stored for each of the supplementary factors. As an alternative, the attachment-destined-part-condition-related supplementary coefficient database 231 may be so designed as to contain a coefficient computing formula in place of the supplementary coefficient values, as in the case of the operation-sequence-related supplementary coefficient database 221 described hereinbefore. In that case, the above-mentioned formula is read out from the attachment-destined-part-condition-related supplementary coefficient database 231 for calculating the estimated value of the assembling-related fraction defective by taking into account the supplementary coefficient determined in accordance with the formula as read out. Incidentally, the attachment-destined-part-condition-related supplementary coefficient database 231 and the attachment-subjected-part-condition-related supplementary coefficient database 232 may be implemented in the mutually different structures.

As mentioned hereinbefore, the likelihood of occurrence of the work failure in the individual attaching operations becomes different remarkably in dependence on the conditions of the shops where the assembling work is performed. Accordingly, in the fraction defective estimating system according to the instant embodiment of the invention, the shop constant database 241 is provided, which is so designed as to store the constants each indicating the likelihood of occurrence of failure on an average in each of the individual shops. In the case of the fraction defective estimating system according to the instant embodiment of the invention, the assembling-related fraction detectives in carrying out the basic work (the downward movement in the case of the instant embodiment) are set as the shop constants for the individual shops, respectively, on the presumption that the other conditions than the shop condition are in the basic state in the individual shops. FIG. 7 is a view showing, by way of example, contents of the shop constant database 241. As can be seen in the figure, a shop "A" has the shop constant "5 ppm" with a shop "B" being allocated with a shop constant of "10 ppm", which means that in the shop "A", the fraction defective of the downward movement is 5 ppm with the fraction defective of the downward movement being 10 ppm in the shop "B" on the assumption that all the other conditions except for the shop condition are in the basic state. Thus, it is safe to say that the shop constant represents an index indicating real reliability of the assembling work in each of the shops. At this juncture, it should further be added that the shop constant represents the constant which reflects influences ascribable to the condition of the worker engaged in the assembling work in the relevant shop, equipment conditions such as those of tools/jigs, production line facilities, etc., environmental conditions of the shop such as temperature, humidity, illumination, noise, etc., production conditions such as of production line speed, the number of production lots and so forth.

As described above, when the process or step of checking whether or not a part attaching work of concern has been completed property after the attaching work of the part which is an object for the estimation of assembling-related fraction defective, the fraction defective can be lowered. To this end, the check-process-related supplementary coefficient database 25 stores supplementary coefficients reflecting the effects of such check process. FIG. 8 is a view showing examples of data in the check-process-related supplementary coefficient database 25. As can be seen in the figure, the check-process-related supplementary coefficient having a value of "0.2" indicates that owing to the check process, 80% of the assembling failures occurred in assembling works of concern can be discovered. In this conjunction, it is noted that in case the ratio at which the failure can be discovered becomes different in dependence on the types of the checking works, the check-processrelated supplementary coefficient may be provided for each of the check processes which differ from one another in respect to the content of the checking work.

Further, an other-constants database 26 serves for storing other constants and other types of coefficients than those mentioned above.

An input-data/computed-data storage unit 27 serves for storing the input data used in the fraction defective computation by the computation program as well as the result of computations obtained by executing the computation program on the basis of the input data. Parenthetically, it should be mentioned that the operation-sequence-related supplementary coefficient database 221, the check-process-related supplementary coefficient database 25 and the shop constant database 241 are not always indispensably required.

Figure 10:
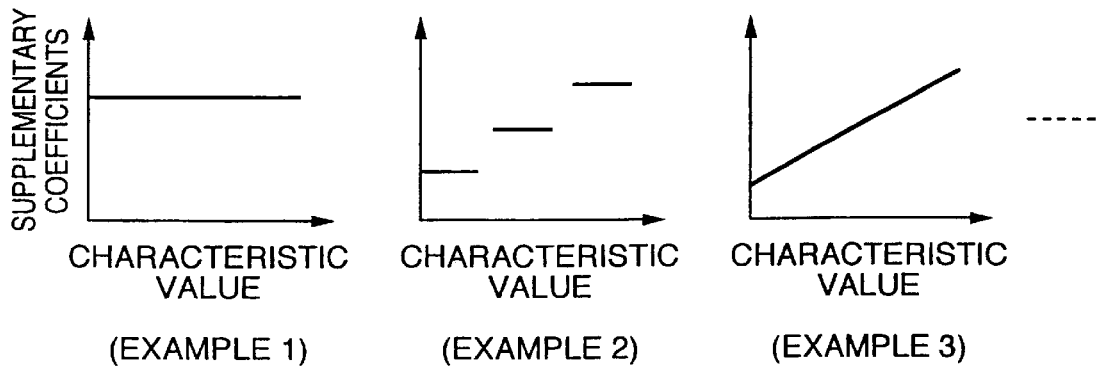
FIG. 10 shows views for graphically illustrating examples of supplementary coefficient pattern which can be employed in carrying out the invention.

It should further be added that the coefficients stored in the respective databases may be so set that the values of the supplementary coefficients can change as the characteristic values of the supplementary factors (e.g. weight value in the case of the weight factor) change, as is illustrated in FIG. 10.

In more concrete, the supplementary coefficient may be so set as to assume a constant value in dependence on the content or type of the supplementary factor regardless of the characteristic value of the supplementary factor, as in the case of Example 1 shown in FIG. 10. (As such supplementary coefficient, there may be mentioned "completed attachment confirming difficulty", "presence of contact inhibiting surface" and the like.) In the case of Example 2 shown in FIG. 10, the value of the supplementary coefficient changes stepwise (e.g. for multi-point alignment). In the case of Example 3 shown in FIG. 10, the value of the supplementary coefficient changes linearly (e.g. when the supplementary coefficient concerns weight). Of course, the supplementary coefficient may be changed curvilinearly as occasion requires. In this case, the coefficients are arithmetically determined on the basis of appropriate one of the functions such as illustrated in FIG. 10 in response to the inputting of the characteristic value as required.

FIG. 9 shows a flow chart for illustrating a procedure for computing the estimated value of the assembling-related fraction defective in a part attaching work, which procedure is executed by the fraction defective estimating system according to the instant embodiment of the invention.

At first, the content of the part attaching work for which the fraction defective is to be estimated is analyzed (step 5).

Subsequently, the content of the analysis performed in the step 5 is expressed by using the standard attaching operation element symbol(s) and the part-related supplementary element symbol(s) which are predetermined in conjunction with the assembling fraction defective estimated value computation program designed to be executed by the fraction defective estimating system 10 (step 6).

In succession, the content of the part attaching work for the object for estimation of the assembling-related fraction defective expressed in terms of the standard attaching operation element symbol(s) and the part-related supplementary element symbol(s) in the step 6 mentioned above are inputted. Additionally, the presence or absence of the check process and the shop constant(s) are inputted as well (step 7).

In this way, after having put into operation the fraction defective estimating system 10, the assembling fraction defective estimated value computation program stored in the computation program storage unit 31 incorporated in the computing apparatus 3 is activated, whereon the information shown in FIG. 1 is inputted with the aid of the keyboard 11, the mouse 12 and/or the pen-input tablet 13 which constitutes a part of the input unit 1. In the case of the fraction defective estimating system according to the instant embodiment of the invention, an input interface menu is displayed on a display unit 21 constituting a part of the output unit 2, so that the operator can input the information mentioned above while viewing the input interface menu as displayed. By virtue of this arrangement, the information input operation can be facilitated. FIGS. 12 and 13 show typical examples of such input interface menu. Further, in case the check process for confirming whether or not the attaching work has been properly exists, input information indicating "presence of check process" is inputted as well. Additionally, the shop constant of a shop where the part attaching work which is the object for estimation of the assembling-related fraction defective is performed or alternatively information specifying the assembling shop of concern is also inputted. Needless to say, unless supplementation for the part is necessary, the part-related supplementary element symbol need not be inputted.

By the way, in the fraction defective estimating system according to the instant embodiment of the invention, the shop constant can be computed in such a manner as described below. At this juncture, it should be recalled that in the fraction defective estimating system now consideration, the shop constant represents the assembling-related fraction defective in the case where the work only for the downward movement operation is performed in the state in which no part supplementing conditions to be taken into account exists in the shop of concern. Additionally, all the attachment-operation-based fraction defective coefficients are defined with reference to the likelihood of occurrence of failure when the basic operation (operation for downward movement) is carried out in the basic state. (In this case, the coefficient value is allocated with a value of "1".) The same holds substantially true for the supplementary coefficients for supplementing the attachment-operation-based fraction defective coefficients. In other words, the supplementary coefficient is defined with reference to the likelihood of occurrence of failure in the basic operation (downward movement) in the basic state. (In that case, the supplementary coefficient is also allocated with the basic value of "1".) For these reasons, the contents of the assembling work which was really carried out a number of times in the past can be analytically examined, to thereby compute the shop constant on the basis of the real fraction defective data for the shop where the assembling work was really performed in the past. In the fraction defective estimating system now under consideration, after the assembling fraction defective estimated value computation program has been activated, a menu is generated on the display unit 21 of the input unit 1 to thereby allow the operator to select either "estimation of assembling-related fraction defective" or alternatively "computation/registration of shop constant". When "computation/registration of shop constant" is selected, an input interface menu illustrated in FIG. 13 is displayed on the display unit 21 of the input unit 1, whereon a code (name, identifier or the like) for specifying a shop to be registered is inputted, which is then followed by inputting of the content of the assembling work really carried out in the specified shop in terms of the standard attaching operation element symbols and the part-related supplementary element symbols in accordance with prompting indicated in the input interface menu (FIG. 12). Subsequently, in case the check process for confirming whether or not the attaching work has been carried out properly exists, the information indicating "check process exists" is inputted. In addition, the real fraction defective of the work concerned is also inputted. Thus, the shop constant of the shop of concern can be computed. In case there exist a plurality of works for which the failure has really occurred in the past, the aforementioned data concerning all of these works are inputted for thereby allowing the shop constant to be determined for each of these works, whereon the shop constant of the shop of concern can be arithmetically determined by resorting to a method of determining a simple means of the shop constants as obtained. In the case of the fraction defective estimating system now under consideration, it is presumed that the shop constant of the shop of concern is determined by calculating a simple means of the shop constants as obtained.

Upon completion of the inputting procedure described above, the estimated value of the fraction defective in the part attaching work of concern is determined in a step 8 by executing the assembling-related fraction defective value estimating computation program on the basis of the information inputted in the step 7 mentioned above (step 8). More specifically, processings (1) and (2) described below are performed to this end.

(1) Various coefficients/constants mentioned below are read out from the various databases on the basis of the input information mentioned above.

The fraction defective coefficients for the individual attaching operations are read out from the standard-attaching-operation-based fraction defective coefficient database 211 on the basis of the standard attaching operation element symbols inputted as mentioned previously. Further, the operation-sequence-related supplementary coefficients conforming to the sequential order of operations are read out from the operation-sequence-related supplementary coefficient database 221.

The part-condition-related supplementary coefficients for the individual supplementary elements are read out from the attachment-destined-part-condition-related supplementary coefficient database 231 or the attachment-subjected-part-condition-related supplementary coefficient database 232 on the basis of the part-condition-related supplementary element symbols inputted as mentioned previously.

In case the information "check process exists" has been inputted, corresponding check-process-related supplementary coefficients are read out from the check-process-related supplementary coefficient database 25.

In case the information specifying the assembling shop has been inputted, the shop constant of the shop of concern is read out from the shop constant database 241.

(2) A computation model is generated. Computation formulae are generated in accordance with the computation model shown in FIG. 11 on the basis of the various coefficients/constants inputted or read out as described previously. In that case, information concerning the supplementing methods based on the various supplementary coefficients, e.g. method resorting to multiplication of the supplementary coefficients, addition or subtraction thereof, may be registered for each of the supplementary factors in the various supplementary coefficient database or alternatively the computation program may be so programmed that the supplementing method is changed in dependence on the types of the supplementary factors. In the fraction defective estimating system now under consideration, it is presumed that the computation program is programmed to change the supplementing method in dependence on the types of the supplementary factors. To this end, creation of the program as well as determination of the coefficient values is realized, for example, on the basis of a rule to the effect that all the supplementary coefficients are added. Thus, according to the teachings of the invention incarnated in the instant embodiment, the fraction defective coefficient for a given operation is supplemented with the part-condition-related supplementary coefficient for supplementing that given operation in each operation sequence. Of course, no supplementation is performed unless the supplementary factor is available. Subsequently, all the supplemented fraction defective coefficients are added together in each operation sequence. In case the information "check process exists", the sum obtained is then multiplied with a check-process-related supplementary coefficient to thereby determine arithmetically a totalized or overall fraction defective coefficient which is then multiplied by the shop constant. In this way, the estimated value of the assembling-related fraction defective of the part attaching work of concern in the shop as specified can be arithmetically determined.

In succession, the estimated value of the assembling-related fraction defective computed in the step 8 mentioned above is outputted to the display unit 21 or a printer unit 22 of the output unit 2 or alternatively to an output unit 23 of other system (step 9). An example of the information outputted to the display unit 21 is illustrated in FIG. 14.

Through the procedure described above, the estimated value of the assembling-related fraction defective for the part attaching work can be arithmetically determined by the system according to the instant embodiment of the invention. Although the foregoing description is directed, by way of example, to the arithmetic determination of the estimated value of the assembling-related fraction defective for the attaching work in a single attaching work process, it should be understood that the estimated value of the assembling-related fraction defective can be arithmetically determined for the whole assembling work of an article or product by inputting the information concerning the attaching operations and/or the information concerning the part-condition-related supplementary elements mentioned previously for the individual work processes, respectively, which are included in the assembling work of the article, for thereby calculating the estimated values of the assembling-related fraction defectives for the individual work processes, respectively, and totalizing the estimated values of the assembling-related fraction defectives as obtained.

Parenthetically, the information concerning the presence or absence of the check process is not always needed. The fraction defective as desired can be calculated even when this information is absent. It should also be mentioned that the above-mentioned information can be spared so far as the shop constant is preset.

Figure 15:
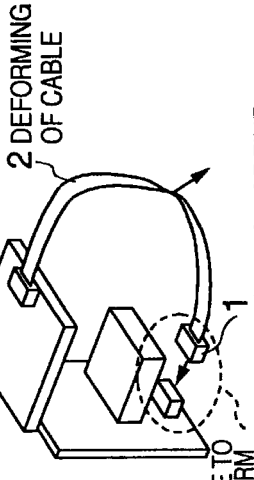
FIG. 15 is a view showing an concrete example for illustrating estimation of a fraction defective in the assembling work fraction defective estimating system according to the invention.

Again referring to the flow chart shown in FIG. 9, description will be directed to a method of computing the estimated value of the assembling-related fraction defective in the part attaching work by taking as example a concrete part attaching work (work involved in attaching a connector cable) shown in FIG. 15. Parenthetically, a table shown in a lower part of FIG. 15 can be generated as an input/output interface image, wherein items to be analyzed are displayed in an input column. In the case of the example now under consideration, after activation of an assembling-related fraction defective value estimating computation program, the work for evaluation can be analyzed while viewing the input/output interface image, whereon input the results of the analyses can be inputted.

The analysis of the part attaching work now under consideration (step 5) shows that the connector cable attaching work for which the assembling-related fraction defective is to be estimated is composed of two works or processes mentioned below.

(1) Insertion of the connector with a large inserting force.
(2) Deforming of the cable.

Further, the conditions of the attachment-destined part as well as the conditions of the attachment-subjected part in the respective works are analyzed. To this end, the analysis is performed for the item(s) entered in the input column of the input/output interface image. At first, concerning the work "insertion of connector with large inserting force", it is analytically determined that the condition of the attachment-subjected part is "fine hole" because of "fine-pin connector". Further, "completed attachment confirming difficulty, i.e., it is difficult to decide whether or not the attachment has been completed" is decided because of "impossibility of visual confirmation of attachment-completed state due to presence of obstacle". Concerning the work (2) "deforming of cable", there exists no part condition to be supplemented.

Subsequently, the work determined analytically in the step 5 is expressed by using the standard attaching operation element symbol and the part-related supplementary element symbol (step 6). At first, the attaching work is expressed in terms of the standard attaching operation element symbol, whereon the part-condition-related supplementary element symbols are allocated to the operation elements on a one-by-one basis. In the case of the example shown in FIG. 15, the work is expressed as follows.
(1) The work "insertion of connector with large inserting force" is expressed by standard attaching operation elements "horizontal movement (symbol: ←)" and then "insertion under pressure (symbol: C)". In other words, the first operation is "horizontal movement (symbol: ←)" and the second operation is "insertion under pressure (symbol: C)".

Subsequently, the part-condition-related supplementary element for the first work "horizontal movement (symbol: ←)" is expressed by "fine hole (symbol: ht)". Further, because of the part-condition-related supplementary element of the "insertion under pressure (symbol: C)" is expressed by "completed assemblage confirming difficulty (symbol: ?)". For the second operation, there is required operation sequence supplementation, which is automatically performed in accordance with the computation program in the fraction defective estimating system now under consideration.
(2) The standard attaching operation element "deforming of cable" is expressed as "deforming (symbol: d)". However, the part-condition-related supplementary element of this operation need not be expressed because there is any other element than the operation-sequence related supplementation. Further, because this operation is the third operation, the operation-sequence related supplementation can be automatically performed in accordance with the check process.

Next, the element symbols generated in the step 6 are inputted to the assembling-related fraction defective value estimating computation program, i.e., program for computing an estimated value of the fraction defective in assembling, in a step 7. By way of example, names of the attachment-destined parts are entered in the part name column and then the standard attaching operation elements and the part-condition-related supplementary elements are entered on a line-by-line basis for each operation included in the operation sequence, as is illustrated in FIG. 15.

In more concrete, in the case of the example shown in FIG. 15, the standard attaching operation element symbol "←" for the first operation in the operation sequence is inputted, whereon the part-condition-related supplementary element "ht" for that operation is entered in the attachment-subjected part condition column "fine hole/tight hole". Subsequently, in the second line, the standard attaching operation element symbol "C" for the second operation in the operation sequence is inputted, whereon the part-condition-related supplementary element symbol "?" for that operation is entered in the attachment-subjected part condition column "completed attachment confirmation". Then, in the third line, the standard attaching operation element symbol "d" for the third operation in the operation sequence is inputted. Concerning this operation, no part-condition-related supplementary element is inputted because such supplementary element does not exist.

Since there is no check process for confirming whether the attaching work of concern has been performed or not, no information is inputted concerning the "check process".

Further, when the shop constant of the shop evaluation is stored in the database, the shop to be evaluated is also inputted. In the case of the example illustrated in FIG. 15, it is assumed that the shop name "A" is inputted. It should further be added that when the shop constant of the shop which can be regarded as being similar to the shop of concern, the former can be inputted. Besides, in case the shop constant is known, it can be directly entered in the shop constant input column.

Now, automatic computation is carried out by executing the assembling-related fraction defective value estimating computation program (step 8). To this end, the coefficient values corresponding, respectively, to the individual symbols entered in the input column in the input/output interface image are read out from the various databases, and the fraction defective coefficient indicating the likelihood of occurrence of failure in the operation is arithmetically determined for each of the operations on the basis of the coefficient values read out from the databases. For instance, the fraction defective coefficient is computed by using expressions 4 or 5 shown in FIG. 25.

As can be seen from the input/output interface image shown in FIG. 15, the fraction defective coefficients are arithmetically determined for the operations, respectively, wherein total sum of the fraction defective coefficients represents the fraction defective coefficient indicating the likelihood of occurrence of failure in the connector cable attaching work and having a value of "30". On the other hand, the shop constant of the shop "A" is read out from the shop constant database 241, and the fraction defective coefficient mentioned above is multiplied by the shop constant to thereby determine the estimated value of the assembling-related fraction defective for the work of concern in the shop "A". In the case of the illustrated example, the shop constant of the shop "A" is "5 ppm", and thus the estimated fraction defective in that shop "A" is "150 ppm".

Incidentally, reading of the coefficient values from the various database may be carried out when the assembling-related fraction defective value estimating computation program is activated and stored in the RAM 33. In that case, the individual coefficient values are read out from the RAM 33 upon every computation, making it unnecessary to access the external storage unit, as a result of which the time involved in the computing operation can be shortened, to an advantage.

The result of the computation of the estimated value of the assembling-related fraction defective as carried out by the fraction defective estimating system 10 in accordance with the assembling-related fraction defective value estimating computation program is outputted (step 9).

It is noted in conjunction with the example illustrated in FIG. 15, types or species of parts can be inputted as the conditions of the attachment-destined part and the attachment-subjected part, respectively, the reason for which can be explained as follows.

The assembling failure may be roughly classified into two categories, i.e., imperfect assembly and injury/soil of part.

The "imperfect assembly" is primarily attributable to inaccurate operation (deviation of the operation accuracy) and error of a worker in the work. In the case of the connector attaching work, there may be mentioned "imperfect insertion (state in which cable is not inserted to full depth)", "insertion of connector in horizontally reversed orientation" and the like.

On the other hand, the "injury/soil of part" may occur as a result of deviation of operation (dispersion of operation accuracy) and/or error brought about by the worker. However, the part suffering "injury/soil of part" can not always be regarded as the defective but it depends on the type of the part even the "injury/soil of part" is same. By way of example, design parts which are exposed in outer appearance of an assembly represent such type of part which may well be considered as defective in case there exists even a bit of injury and/or soil. To say in another way, parts undergone an external force (stress) of same magnitude can not always be regarded as defective. Rather, it may depend on the part species or types, i.e., functions or roles imparted to the parts.

For the reason mentioned above, the coefficient values indicating strengths (withstanding capabilities) of individual parts against external force are stored in the database for each type of the part for thereby making it possible to input the part species or types of the attachment-destined parts and the attachment-subjected parts so that the estimated fraction defective can be arithmetically determined by taking into account the probability of "injury/soil of part" defect by comparing the strength (withstanding capability) of a part for evaluation with magnitude of the external force (stress) acting on that part upon attaching operation thereof. In this way, in the fraction defective estimating system according to the instant embodiment of the invention, not only the defect due to "imperfect assembly" but also spoil due to "injury/soil of part" can be taken into account in the estimation of the fraction defective.

Next, description will be directed to the fraction defective estimating system according to another embodiment of the present invention.

Figure 18:
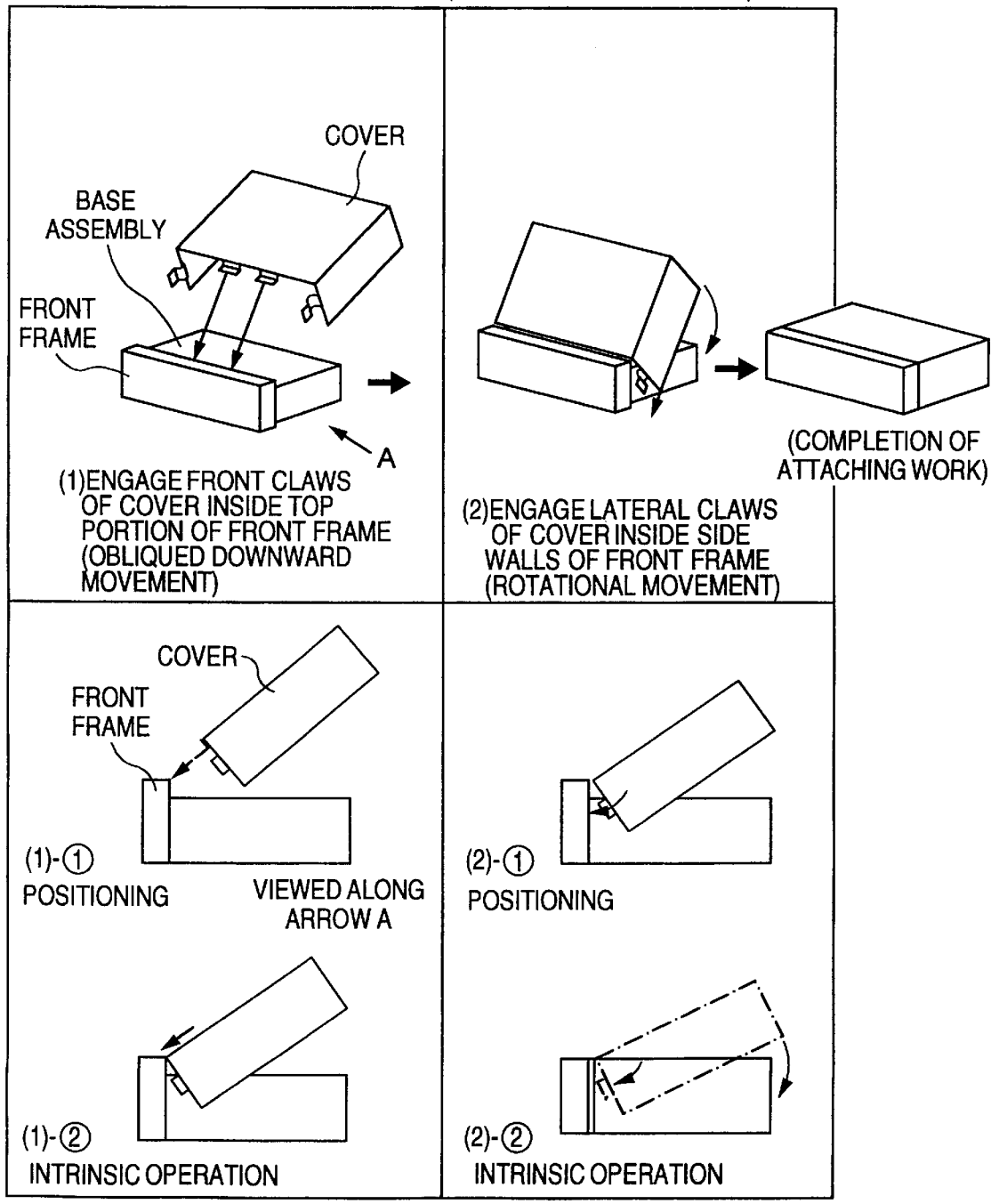
FIG. 18 is a view for illustrating an example of assembling work which can be completed by two types of attaching operations.

Basically, a working operation may be considered as repetition of "positioning operation" and "post-positioning operation. FIG. 17 shows an example of an attaching work which can be completed through a single attaching operation "work for insertion of a part into a round hole formed in a cylinder through downward movement". As can be seen from FIG. 17, although the work illustrated therein is "operation for downward movement", the contents of which are, however, "positioning operation" and "post-positioning operation". Further, FIG. 18 is a view illustrating, by way of example, an attaching work "cover mounting work" which can be completed by two types of attaching operations. This work is composed of two operation processes, i.e., "oblique-downward movement" process and "rotational movement" process, wherein standard operations involved in each of these processes are "positioning operation" and "post-positioning operation".

Figure 19:
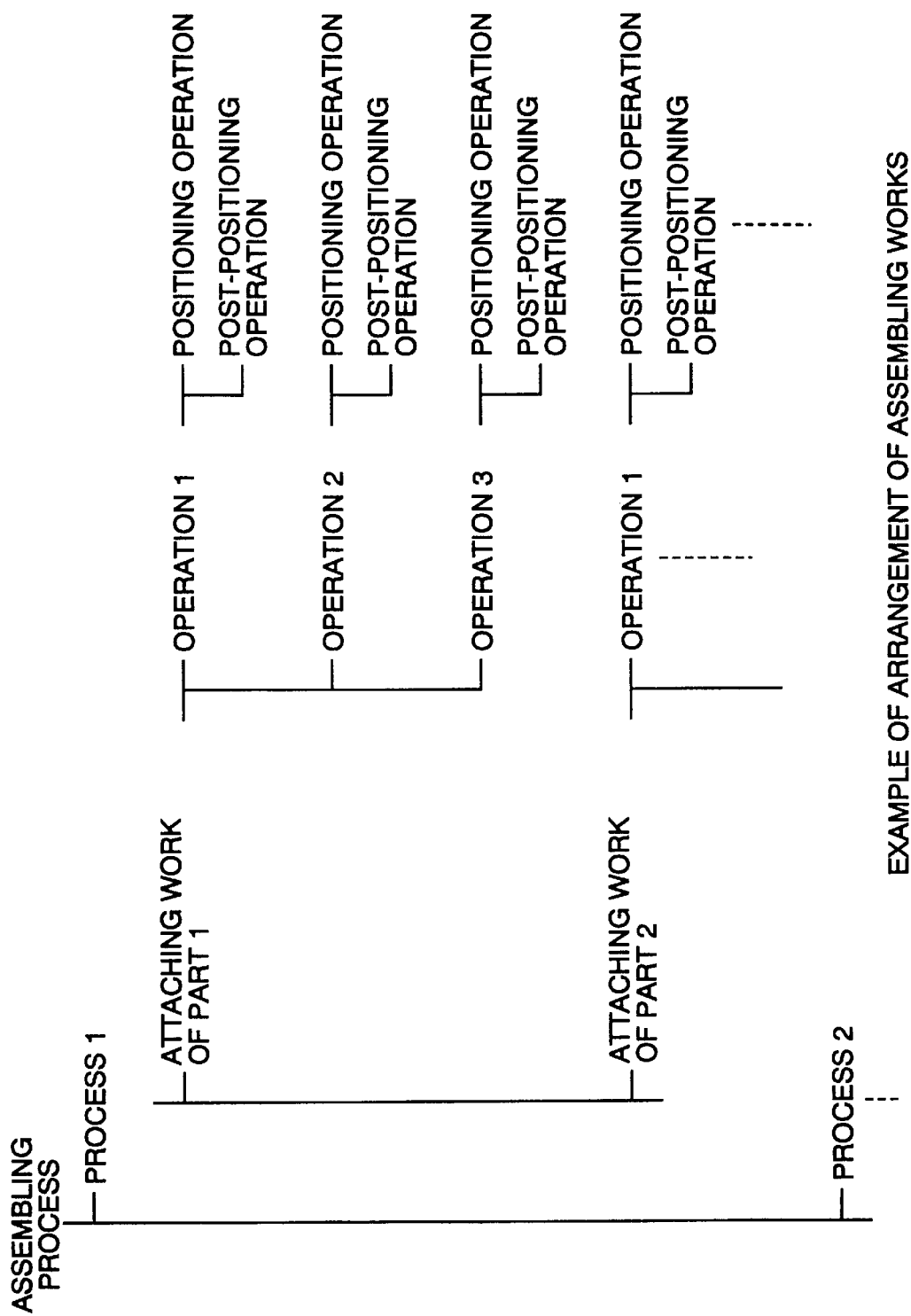
FIG. 19 is a view illustrating an arrangement of assembling work processes.

There are some of the standard operations which can be completed through only one operation "positioning operation" such as operation for holding a part or operation for shaping an electric conductor. However, many of operations are each achieved by a combination of "positioning operation" and succeeding "post-positioning operation". FIG. 19 is a view illustrating, by way of example, an arrangement of a work process. Referring to the figure, an attaching work of a part "1" in a process or step "1" is constituted by three operations (first to third operations "1", "2" and "3"), wherein each of the operations "1", "2" and "3" is realized by repeating "positioning" and "post-positioning operation".

As will now be understood, the work is generally constituted by "positioning" and "post-positioning operation". Consequently, the work failures can roughly be classified into two types, i.e., work failures occurring in the positioning operation and work failures occurring in the post-positioning operation, which has been experimentally established by the inventors in the course of studies and experiments in developing the fraction defective estimating technique.

Firstly, the failure or defect occurring in the positioning operation is ascribable to dispersion (inaccuracy) of the positions or postures of parts in the positioning operation. When the attachment process transits to the intrinsic operation with inadequate positioning, not only such a failure may occur that the intrinsic operation is rendered impossible (incomplete-work failure) but also such situation may be incurred that a coupled or bonded or connected portion between the attachment-destined part and the attachment-subjected part is injured or deformed due to a force exerted in the intrinsic operation although it depends on the strength of such coupled portion. Ordinarily, a worker makes transition to a post-positioning operation after having confirmed that the positioning is proper. If the positioning is improper, he or she corrects the positioning before starting the intrinsic operation or post-positioning operation. However, when difficulty is encountered in confirming the positioning due to less-visibility of the relevant location or when the confirmation of the positioning is omitted unintentionally, the failures such as mentioned above are likely to occur.

On the other hand, the assembling failures ascribable to the post-positioning operation may be classified into failures due to path control failure in the post-positioning operation, i.e., deviation or inaccuracy of a path along which the part is moved for attachment and failures due to insufficient operative effort. The assembling failure due to the path control failure in the post-positioning operation is likely to occur with a high frequency when the part has to be moved along a predetermined path over an extended distance among others. On the other hand, the assembling failure ascribable to insufficient of the operative effort applied in the post-positioning operation will occur when the operative effort required for the attachment work can not be obtained. By way of example, when a large magnitude of the operative effort or force is required as in the case of insertion operation under pressure or press-fitting, the assembling failure mentioned just above is likely to occur if the operative effort or force of a predetermined magnitude can not be applied due to restriction imposed in view of properties of the part of concern and operation thereof.

The second embodiment of the present invention is directed a fraction defective estimating system which is suited for evaluating occurrence potentials of the faults such as mentioned above.

The system according to the instant embodiment of the invention is implemented in a substantially same structure as the fraction defective estimating system of the first embodiment described hereinbefore (FIG. 1) except for differences in the information stored in the standard-attaching-operation-based fraction defective coefficient database 211 and the attachment-destined-part-condition-related supplementary coefficient database 231 and the computation program for handling the information.

FIG. 21 is a view illustrating the information to be stored in the standard-attaching-operation-based fraction defective coefficient database 211. The information now under consideration has features mentioned below.

A first feature can be seen in that three kinds of fraction defective coefficients, i.e., positioning-failure-ascribable fraction defective coefficient, path-control-failure-ascribable fraction defective coefficient and operative-effort-insufficiency-ascribable failure fraction defective coefficient are set for one standard attaching operation. A second feature resides in that a standard attaching operation is subclassified into two sorts of operations, i.e., the operation for which higher accuracy exceeding a given reference is required and the operation which is free of such precision requirement. By way of example, the downward movement may include such downward movement for which high positioning accuracy is required and such sort of downward movement which is free of such positioning requirement. According to the teachings of the invention incarnated in the embodiment now under consideration, the positioning-failure-ascribable fraction defective coefficient is set to different values for the two sorts of downward movements mentioned above. Parenthetically, in the case of the example illustrated in FIG. 21, the positioning fraction defective coefficients are set with reference to the basic positioning fraction defective coefficient set to "1" (reference) for "the positioning downward movement requiring high accuracy". To say in another way, multiples indicating how many times high likelihoods of occurrence of failure are expected for the downward movements relative to the positioning failure occurrence potential of "downward movement for the positioning requiring high accuracy".

On the other hand, FIG. 22 shows information to be stored in the attachment-destined-part-condition-related supplementary coefficient database 231 and the attachment-subjected part-condition-related supplementary coefficient database 232. To this end, three kinds of supplementary coefficient values are set for each of the supplementary factors as in the case of the information to be stored in the standard-attaching-operation-based fraction defective coefficient database 211.

Further, the computation program designed for handling the information mentioned above exhibits features mentioned below. As described previously, the path control failure occurrence potential of the post-positioning operation and the operative-effort-insufficiency failure occurrence potential of post-positioning operation become high particularly under some limited supplementary conditions. Accordingly, the computation program employed in the fraction defective estimating system according to the instant embodiment of the invention is so designed as to compute the path control failure occurrence potential or the operative-effort-insufficiency failure occurrence potential only when given specific supplementary element is added to the operation included in the work under evaluation. More specifically, for the operation added with the supplementary element indicating an over-extended-distance covering operation, i.e., operation over an extended distance, the path control failure occurrence potential is arithmetically determined in addition to the positioning failure occurrence potential, whereas for the operation added with the supplementary element indicating a large operative effort, the operative-effort-insufficiency failure occurrence potential is computed in addition to the positioning failure occurrence potential. In other words, in dependence on the type of the supplementary element added to an attaching operation, decision is made as to whether or not this operation has the path control failure occurrence potential or the operative-effort-insufficiency failure occurrence potential in addition to the positioning failure occurrence potential, to thereby execute computation for determining the path control failure occurrence potential or the operative-effort-insufficiency failure occurrence potential in addition to the positioning failure occurrence potential as occasion requires.

Now, description will turn to a method of computing an estimated value of the assembling-related fraction defective in a part attaching work by taking as example a part attaching work in the concrete by reference to FIGS. 23 and 24. In the examples (1) to (4) illustrated in FIGS. 23 and 24, such work is presumed in which a cylindrical attachment-destined part having a diameter a is to be inserted into a round hole, wherein the conditions under which the attachment-subjected part lies are changed from one to another example. In more concrete, in the case of the example (1), a downward movement for which high accuracy of positioning is required because an insertion guide of the round hole representing the attachment-subjected part is small (i.e., outer diameter of a chamfered portion of the round hole is small). On the other hand, in the case of the example (2), it is presumed that the inserting guide of the round hole representing the attachment-subjected part has a large diameter (having a chamfered portion of a large outer diameter) and thus high precision or accuracy is not required for the positioning. In other words, a downward movement work can be performed without need for paying especial attention to the work. Further, in the example (3), a downward movement for which high accuracy of positioning is required because an insertion guide of the round hole representing the attachment-subjected part has a small outer diameter at the chamfered portion of the round hole and additionally this downward movement work is required to be performed over an extended distance because the round hole is deep. Furthermore, in the case of the example (4), it is presumed that the inserting guide of the round hole representing the attachment-subjected part has a large diameter (having a chamfered portion of a large outer diameter) and thus high accuracy is not required for the positioning. Consequently, a downward movement work can be performed without need for paying especial attention to the work. However, in this downward movement work, a large inserting force is required since a tight fitting work is required because of small clearance between the diameter a of the attachment-destined part and the hole diameter c of the attachment-subjected part. At first, description will be made of methods for arithmetically determining the fraction defective coefficients indicating failure occurrence potential in the assembling works shown as the examples (1) to (4), respectively, in FIGS. 23 and 24. In this conjunction, it is assumed that no check process is performed in these exemplary works (1) to (4).

Firstly, the work exemplified at (1) in FIG. 23 is realized by a downward movement for which high positioning accuracy is required. However, there are no supplementary elements indicating the operation over an extended distance and a large operative effort. Accordingly, the work analysis will result in "downward movement for positioning" expressed by a symbol "$\downarrow_r$". Upon inputting of the result of this work analysis, the relevant positioning-failure-ascribable fraction defective coefficient is read out from the standard-attaching-operation-based fraction defective coefficient database 211. In this case, the positioning-failure-ascribable fraction defective coefficient will assume a value "1" because of "downward movement for positioning" (symbol: "$\downarrow$") from the definition shown in FIG. 21. Besides, because the supplementary elements indicating the operation over an extended distance and the operation requiring a large operative effort are not inputted, neither the path-control-failure-ascribable fraction defective coefficient nor the operative-effort-insufficiency-ascribable failure fraction defective coefficient need not be determined. Thus, the totalized or overall fraction defective coefficient for the work (1) shown in FIG. 23 is "1" in total. A practical fraction defective can be obtained by multiplying this fraction defective coefficient "1" by a shop constant inputted in advance.

Next, the work exemplified at (2) in FIG. 23 is realized by a downward movement for which positioning accuracy is not required because of a large diameter of the insertion guide. However, there are no supplementary elements indicating operation over an extended distance and a large operative effort. Accordingly, the work analysis will result in a simple "downward movement" expressed by a symbol "↓". Upon inputting of this work analysis result, the relevant positioning-failure-ascribable fraction defective coefficient is read out from the standard-attaching-operation-based fraction defective coefficient database 211. In this case, the positioning-failure-ascribable fraction defective coefficient will assume a value "0.1" because of "downward movement" (symbol: "↓") from the definitions shown in FIG. 21. Besides, because the supplementary elements indicating the operation over an extended distance and the operation requiring a large operative effort are not inputted, neither the path-control-failure-ascribable fraction defective coefficient nor the operative-effort-insufficiency-ascribable failure fraction defective coefficient need not be determined. Thus, the overall fraction defective coefficient of the work (2) shown in FIG. 23 is "0.1" in total. A practical fraction defective can be obtained by multiplying this fraction defective coefficient "0.1" by a shop constant inputted in advance.

The work exemplified at (3) in FIG. 24 is realized by a downward movement for which high positioning accuracy is required because of a small diameter of the insertion guide. Accordingly, the work analysis will result in "downward movement for positioning" expressed by a symbol "↓," with the supplementary element being "over-extended-distance insertion" (symbol: lh). Upon inputting of this work analysis result, the relevant positioning-failure-ascribable fraction defective coefficient is read out from the standard-attaching-operation-based fraction defective coefficient database 211. In this case, the positioning-failure-ascribable fraction defective coefficient will assume a value "1" because of "downward movement for positioning" (symbol: "↓,") in view of the definitions shown in FIG. 21. Further, in this case, since the supplementary element indicating the over-extended-distance insertion is inputted, the positioning failure supplementary coefficient "1" for the over-extended-distance insertion is read out from the attachment-subjected-part-condition-related supplementary coefficient database 232 (see FIG. 22). Additionally, because of the over-extended-distance insertion, the path-control-failure-ascribable fraction defective coefficient is arithmetically determined. To this end, the path-control-failure-ascribable fraction defective coefficient "1" is read out from the standard-attaching-operation-based fraction defective coefficient database 211 (see FIG. 21). Subsequently, the path-control-failure-ascribable fraction defective coefficient "2" for the supplementation relating to the over-extended-distance insertion is read out from the attachment-subjected-part-condition-related supplementary coefficient database 232 (see FIG. 22). Since the supplementary elements indicating the operation requiring a large operative effort is not inputted in this case, the operative-effort-insufficiency-ascribable failure fraction defective coefficient need not be determined. Thus, the overall fraction defective coefficient of the work (3) shown in FIG. 24 is "3" in total because the positioning-failure-ascribable fraction defective coefficient is "1" (=1×1)" and because the path-control-failure-ascribable fraction defective coefficient is "2" (=1×2)" and thus "3" in total. A practical fraction defective can be obtained by multiplying this fraction defective coefficient "3" by a shop constant inputted in advance.

Finally, the work shown at (4) in FIG. 24 is considered. Since it is presumed that the insertion guide has a large diameter, the requirement for positioning accuracy may be put outside of consideration. Further, because the work analysis will simply result in "downward movement" expressed by a symbol "↓" because of the absence of supplementary element. However, in view of the supplementary condition "tight fitting" represented by a symbol "th", the work now under consideration can be analytically expressed by operation "downward movement" (symbol: "↓") and supplementary element "tight fitting" (symbol: "th"). Upon inputting of the results of the work analysis, the relevant positioning-failure-ascribable fraction defective coefficient is read out from the standard-attaching-operation-based fraction defective coefficient database 211. In this case, the positioning-failure-ascribable fraction defective coefficient will assume a value "0.1" because of "downward movement" (symbol: "↓") in view of the definitions shown in FIG. 21. Further, in this case, since the supplementary element "tight fitting" is inputted, the positioning failure supplementary coefficient "1" for the "tight fitting" is read out from the attachment-subjected-part-condition-related supplementary coefficient database 232 (see FIG. 22). Additionally, because of "tight fitting", i.e., operation for which large operative effort is demanded, the operative-effort-insufficiency-ascribable failure fraction defective coefficient is arithmetically determined. To this end, the operative-effort-insufficiency-ascribable failure fraction defective coefficient "1" is read out from the standard-attaching-operation-based fraction defective coefficient database 211 (see FIG. 21). Subsequently, the operative-effort-insufficiency-ascribable failure fraction defective coefficient "5" for supplementation in view of the "tight fitting" is read out from the attachment-subjected part-condition-related supplementary coefficient-database 232 (see FIG. 22). Since the supplementary element indicating the operation over an extended distance is not inputted, the path-control-failure-ascribable fraction defective coefficient need not be determined. Thus, the fraction defective coefficient of the work (4) shown in FIG. 24 is "5.1" in total because the positioning-failure-ascribable fraction defective coefficient is "0.1" (=0.1×1)" and because the operative-effort-insufficiency-ascribable failure fraction defective coefficient is "5" (=1×5)". A practical fraction defective can be obtained by multiplying this fraction defective coefficient "5.1" by a shop constant inputted in advance.

FIG. 20 is a view showing, by way of example only, the fraction defective coefficients for the positioning failure, the path control failure and the operative-effort-insufficiency-ascribable failure, respectively, which can be outputted from the system according to the second embodiment of the invention.

As will now be understood from the foregoing, according to the teaching of the present invention incarnated in the second embodiment, it is possible to estimate the fraction defectives finely by taking into consideration the occurrence potential for each of the positioning failure, the path control failure and the operative effort insufficiency, whereby the accuracy in estimating the fraction defectives can be significantly enhanced, to an advantage. Furthermore, because the occurrence potentials of the positioning failure, the path control failure and the operation effort insufficiency, respectively, are outputted, it is possible to determine quantitatively which of the operations involved in the work under evaluation has what degree of failure potential. Thus, in the stage of design preceding to the assembling for which estimation of the fraction defective is performed according to the teaching of the invention, information concerning improvements to be done can be made available. Besides, the failure events or phenomena can also be predicted on the basis of combinations of levels of the occurrence potentials and the part-condition-related supplementary coefficients of various types.

As is apparent from the foregoing description, according to the teachings of the present invention, the assembling-related fraction defectives in the assembling work of an article can be estimated with high accuracy for each of the part attaching works already at the stage of article design or a manufacturing process planning stage in precedence to manufacture of the article, which in turn means that those part attaching works exhibiting high fraction defective coefficients can be pinpointed without any appreciable difficulty. By improving the works exhibiting high fraction defective coefficients, the assembling-related fraction defective can be reduced effectively. Thus, with the system according to the present invention, design and manufacture of articles or products can be realized with significantly enhanced reliability.

Many features and advantages of the present invention are apparent from the detailed description and thus it is intended by the appended claims to cover all such features and advantages which fall within the true spirit and scope of the invention. Further, since numerous modifications and combinations will readily occur to those skilled in the art, it is not intended to limit the invention to the exact construction and operation illustrated and described. By way of example, a storage medium which stores data, information, program(s) and others for carrying out the fraction defective estimation taught by the invention equally falls within the scope of the invention. Accordingly, all suitable modifications and equivalents may be resorted to, falling within the spirit and scope of the invention.

What is claimed is:

1. A fraction defective estimating method, wherein stored previously are fraction defective coefficients separately for individual standard attaching operations resulting from classification of attaching operations involved in assembling an article, first supplementary coefficients separately for properties of attachment-destined parts constituting said article and second supplementary coefficients separately for properties of attachment-subjected parts constituting said article in cooperation with said attachment-destined parts, comprising:

a step of inputting at least first information representing properties of an attachment-destined part of an object under evaluation, second information representing properties of an attachment-subjected part of said object under evaluation and third information representing a standard attaching operation or operations involved in attachment of said attachment-destined part to said attachment-subjected part;

a step of extracting relevant ones of said first and second supplementary coefficients by using said first and second input information;

a step of extracting a relevant fraction defective coefficient by using said third input information; and a step of determining arithmetically an attachment-related fraction defective for said object under evaluation by supplementing said extracted fraction defective coefficient with said first and second extracted supplementary coefficients.

2. A fraction defective estimating method according to claim 1, wherein stored previously is a fourth supplementary coefficient corresponding to presence or absence of a process for confirming whether said attachment-destined part has been properly attached to said attachment-subjected part, comprising:

a step of determining arithmetically an attachment-related fraction defective for said object under evaluation by supplementing additionally said extracted fraction defective coefficient with said fourth supplementary coefficient in the case where said process for confirming whether said attachment-destined part has been properly attached to said attachment-subjected part exists.

3. A fraction defective estimating method according to claim 1, wherein properties of said attachment-destined part or said attachment-subjected part includes at least one of shape, dimensional precision, surface state, size, weight, material and function.

4. A fraction defective estimating method according to claim 1, wherein said standard attaching operation includes a positioning/attaching operation.

5. A fraction defective estimating method according to claim 1, wherein said fraction defective coefficients include at least a fraction defective coefficient relating to path control failure and a fraction defective coefficient relating to operative-effort-insufficiency-ascribable failure.

6. A fraction defective estimating method according to claims 1, wherein said supplementary coefficients include at least a supplementary coefficient relating to path control failure and a supplementary coefficient relating to operative-effort-insufficiency-ascribable failure.

7. A fraction defective estimating method, wherein stored previously are fraction defective coefficients separately for individual standard attaching operations resulting from classification of attaching operations involved in assembling an article, first supplementary coefficients separately for properties of attachment-destined parts constituting said article, second supplementary coefficients separately for properties of attachment-subjected parts constituting said article in cooperation with said attachment-destined parts and third supplementary coefficients separately for numbers of said standard attaching operations involved in attachments of said attachment-destined parts to said attachment-subjected parts, respectively, comprising:

a step of inputting at least first information representing properties of an attachment-destined part of an object under evaluation, second information representing properties of an attachment-subjected part of said object under evaluation and third information representing a standard attaching operation or operations involved in attachment of said attachment-destined part to said attachment-subjected part;

a step of extracting relevant ones of said first, second and third relevant supplementary coefficients by using said first and second input information and a number of the standard attaching operations arithmetically determined on the basis of said third input information;

a step of extracting a relevant fraction defective coefficient by using said third input information; and a step of determining arithmetically an attachment-related fraction defective of said object under evaluation by supplementing said extracted fraction defective coefficient with said first, second and third extracted supplementary coefficients.

8. A fraction defective estimating method, wherein stored previously are fraction defective coefficients separately for individual standard attaching operations resulting from classification of attaching operations involved in assembling an article, first supplementary coefficients separately for properties of attachment-destined parts constituting said article, second supplementary coefficients separately for properties of attachment-subjected parts constituting said article in cooperation with said attachment-destined parts and third supplementary coefficients separately for sequential positions of said standard attaching operations involved in attachments of said attachment-destined parts to said attachment-subjected parts, respectively, comprising:

a step of inputting at least first information representing properties of an attachment-destined part of an object under evaluation, second information representing properties of an attachment-subjected part of said object under evaluation and third information representing a standard attaching operation or operations involved in attachment of said attachment-destined part to said attachment-subjected part;

a step of extracting relevant ones of said first, second and third supplementary coefficients by using said first, second and third input information;

a step of extracting a relevant fraction defective coefficient by using said third input information; and a step of determining arithmetically an attachment-related fraction defective for said object under evaluation by supplementing said extracted fraction defective coefficient with said first, second and third extracted supplementary coefficients.

9. A fraction defective estimating system, comprising:

storage means for storing fraction defective coefficients separately for individual standard attaching operations resulting from classification of attaching operations involved in assembling an article, first supplementary coefficients separately for properties of attachment-destined parts constituting said article and second supplementary coefficients separately for properties of attachment-subjected parts constituting said article in cooperation with said attachment-destined parts, input means for inputting at least first information representing properties of an attachment-destined part of an object under evaluation, second information representing properties of an attachment-subjected part of said object under evaluation and third information representing a standard attaching operation or operations involved in attachment of said attachment-destined part to said attachment-subjected part; and arithmetic means including first extracting means for extracting relevant ones of said first and second supplementary coefficients by using said first and second input information, second extracting means for extracting a relevant fraction defective coefficient by using said third input information, and arithmetic operation means for determining arithmetically an attachment-related fraction defective for said object under evaluation by supplementing said extracted fraction defective coefficient with said first and second extracted supplementary coefficients.

10. A fraction defective estimating system according to claim 9, wherein properties of said attachment-destined part or said attachment-subjected part includes at least one of shape, dimensional precision, surface state, size, weight, material and function.

11. A fraction defective estimating system according to claim 9, wherein said standard attaching operation includes positioning/attaching operation.

12. A fraction defective estimating system according to claim 9, wherein said fraction defective coefficients include at least a fraction defective coefficient concerning path control failure and a fraction defective coefficient concerning operative-effort-insufficiency-ascribable failure.

13. A fraction defective estimating system according to claim 9, wherein said supplementary coefficients include at least a supplementary coefficient concerning path control failure and a supplementary coefficient concerning operative-effort-insufficiency-ascribable failure.

14. A fraction defective estimating system, comprising:

storage means for storing fraction defective coefficients separately for individual standard attaching operations resulting from classification of attaching operations involved in assembling an article, first supplementary coefficients separately for properties of attachment-destined parts constituting said article, second supplementary coefficients separately for properties of attachment-subjected parts constituting said article in cooperation with said attachment-destined parts and third supplementary coefficients separately for numbers of said standard attaching operations involved in attachments of said attachment-destined parts to said attachment-subjected parts, respectively, input means for inputting at least first information representing properties of an attachment-destined part of an object under evaluation, second information representing properties of an attachment-subjected part of said object under evaluation and third information representing a standard attaching operation or operations involved in attachment of said attachment-destined part to said attachment-subjected part; and arithmetic means including first extracting means for extracting relevant ones of said first, second and third supplementary coefficients by using said first and second input information and a number of the standard attaching operations arithmetically determined on the basis of said third input information, second extracting means for extracting a relevant fraction defective coefficient by using said third input information, and arithmetic operation means for determining arithmetically an attachment-related fraction defective for said object under evaluation by supplementing said extracted fraction defective coefficient with said first, second and third extracted supplementary coefficients.

15. A fraction defective estimating system, comprising:

storage means for storing fraction defective coefficients separately for individual standard attaching operations resulting from classification of attaching operations involved in assembling an article, first supplementary coefficients separately for properties of attachment-destined parts constituting said article, second supplementary coefficients separately for properties of attachment-subjected parts constituting said article in cooperation with said attachment-destined parts and third supplementary coefficients separately for sequential positions of said standard attaching operations involved in attachments of said attachment-destined parts to said attachment-subjected parts, respectively, input means for inputting at least first information representing properties of an attachment-destined part of an object under evaluation, second information representing properties of an attachment-subjected part of said object under evaluation and third information representing a standard attaching operation or operations involved in attachment of said attachment-destined part to said attachment-subjected part; and arithmetic means including first extracting means for extracting relevant ones of said first, second and third supplementary coefficients by using said first, second and third input information, second extracting means for extracting a relevant fraction defective coefficient by using said third input information, and arithmetic operation means for determining arithmetically an attachment-related fraction defective for said object under evaluation by supplementing said extracted fraction defective coefficient with said first, second and third extracted supplementary coefficients.

16. A fraction defective estimating system according to claim 15, wherein said storage means stores a fourth supplementary coefficient corresponding to presence or absence of a process for confirming whether said attachment-destined part has been properly attached to said attachment-subjected part is stored, and wherein said arithmetic means determines arithmetically an attachment-related fraction defective of said object under evaluation by supplementing additionally said extracted fraction defective coefficient with said fourth supplementary coefficient in the case where said process for confirming whether said attachment-destined part has been properly attached to said attachment-subjected part exists.

17. A recording medium, storing:

fraction defective coefficients for every standard attaching operation of attachment-destined parts;

supplementary coefficients for every property of attachment-destined parts;

supplementary coefficients for every property of attachment-subjected parts; and a program for arithmetically determining an assembling-related fraction defective of an object under evaluation, wherein said object under evaluation is expressed in terms of a combination of said standard attaching operations, and wherein said program is so designed that when information concerning said combination and properties of an attachment-destined part and an attachment-subjected part constituting said object under evaluation are inputted, relevant ones of the fraction defective coefficients of standard attaching operations, supplementary coefficients relating to the attachment-destined parts and supplementary coefficients relating to the attachment-subjected parts are extracted from the input information, respectively, for thereby arithmetically determining an assembling-related fraction defective for said object under evaluation by adding together values obtained by supplementing the extracted individual fraction defective coefficients with the supplementary coefficients relating to said attachment-destined part and the supplementary coefficients relating to said attachment-subjected part.

* * * * *